United States Patent
Russell et al.

(10) Patent No.: US 8,625,627 B2
(45) Date of Patent: Jan. 7, 2014

(54) APPARATUS AND METHOD FOR CONTROLLING DATA TRANSMISSION

(75) Inventors: Patrick Gene Russell, Ottawa (CA); Luc Alain Chouinard, Ottawa (CA); Kizito Gysbertus Antonius Van Asten, Ottawa (CA)

(73) Assignee: Alcatel Lucent, Paris (FR)

( * ) Notice: Subject to any disclaimer, the term of this patent is extended or adjusted under 35 U.S.C. 154(b) by 962 days.

(21) Appl. No.: 12/718,992

(22) Filed: Mar. 7, 2010

(65) Prior Publication Data

US 2010/0155493 A1 Jun. 24, 2010

Related U.S. Application Data

(62) Division of application No. 10/247,472, filed on Sep. 20, 2002, now Pat. No. 7,751,418.

(30) Foreign Application Priority Data

Dec. 31, 2001 (CA) ...................................... 2366397

(51) Int. Cl.
  *H04L 12/28* (2006.01)
(52) U.S. Cl.
  USPC ............................ 370/423; 370/412; 370/426

(58) Field of Classification Search
  USPC ........................................ 370/412, 423, 426
  See application file for complete search history.

(56) References Cited

U.S. PATENT DOCUMENTS

| | | | |
|---|---|---|---|
| 6,205,145 B1 | 3/2001 | Yamazaki | |
| 6,671,271 B1 | 12/2003 | Takemura | |
| 6,760,346 B1 | 7/2004 | Suemura | |
| 7,012,896 B1 * | 3/2006 | Haywood et al. | ............. 370/236 |
| 7,221,678 B1 | 5/2007 | Hughes | |
| 2001/0007562 A1 | 7/2001 | Matsuoka | |
| 2002/0034183 A1 | 3/2002 | Prabhakar | |

* cited by examiner

*Primary Examiner* — Jason Mattis
(74) *Attorney, Agent, or Firm* — IP-MEX, Inc.

(57) ABSTRACT

An interface for controlling the transmission of data between integrated circuit (IC) chips. The interface comprises a data bus for transmitting data from a first integrated circuit chip to a second integrated circuit chip, and a control bus for transmitting control signals between the first and second integrated circuits. The first IC has a memory for receiving data for transmission to the second IC, and the second IC has a scheduler and a data output port, the scheduler being arranged to control the transfer of data from the memory of the first IC to the data output port of the second IC via the data bus. The interface is capable of stopping and reinitiating data transmission on detection of errors in transmitted data, and the interface may include a code transfer bus for transferring error detection code separately from associated data.

40 Claims, 11 Drawing Sheets

APPARATUS AND METHOD FOR CONTROLLING DATA TRANSMISSION

CROSS REFERENCE TO RELATED APPLICATIONS

This is a divisional application of the U.S. patent application Ser. No. 10/247,472 filed in Sep. 20, 2002, now U.S. Pat. No. 7,751,418 which claims priority from the Canadian application serial number 2,366,297 filed on Dec. 31, 2001.

FIELD OF THE INVENTION

The present invention relates to an apparatus and method for controlling the transmission of data, and in particular, but not limited to an apparatus and method for managing the transmission of data in a switching element for a communication network.

BACKGROUND OF THE INVENTION

Switching elements for communication networks generally include multiple input ports for receiving data from a plurality of different sources and multiple output ports for transmitting the received data to various destinations over the network. An example of a known switching element includes an integrated circuit device having an input for receiving data from a communication network, and an input buffer, which may include a number of queues for temporarily storing data before being output from the device onto the network. The device further includes a scheduler for controlling the order in which data stored in the various queues is output from the device, according to a set of predetermined priority rules. The speed at which data can be transferred between any two points in a network is determined by the components of the network path, for example, communication links and switching elements, each of which has an associated delay. In an optical communication system, switching elements potentially contribute to a relatively high proportion of the total delay associated with a communication path due to the conversion of optical signals to electrical signals and vice versa and delays associated with the transfer of data from an input port of the switching element to the appropriate output port. Therefore, one of challenges facing designers is to minimize the time for transferring data cells across a switching element. Ideally, the capacity for data transfer between an input port and an output port of a switching element should at least match the capacity of the communication links to which the ports are connected.

SUMMARY OF THE INVENTION

According to one aspect of the present invention, there is provided an apparatus for controlling the transmission of data, comprising first and second integrated circuit chips, and data transmission means for transmitting data from the first integrated circuit chip to the second integrated circuit chip, the first integrated circuit chip having a memory for receiving data for transmission to the second integrated circuit chip, and the second integrated circuit chip having a scheduler and a data output port, the scheduler being arranged to control the transfer of data from the memory to the data output port.

In this arrangement, the scheduler which controls the transfer of data from memory to an output port is disposed on a different integrated circuit chip to that which contains the memory for storing data which is to be transferred to the output port under the control of the scheduler. In contrast to prior art arrangements, in which the scheduler resides on the same chip as the memory and is limited to controlling the transfer of data from that memory, the architecture of the present invention allows the scheduler to control the transfer of data from an external or off-chip memory, and is therefore not so limited. This capability allows the number of data inputs and the memory, which is served by the scheduler to be expanded or scaled according to the system requirements. For example additional integrated circuit chips having additional data inputs and additional memory may be added to the system and connected to the scheduler IC chip as and when necessary. Advantageously, this removes the need for customers to purchase powerful but expensive switching equipment for servicing some large future capacity, but which will be underused for some time.

In a preferred embodiment, the apparatus further includes a control bus, separate from the data transmission means, for carrying control signals between the first and second IC chips. Advantageously, this arrangement provides a means of conveying control signals required to manage the transfer of data from the first IC to the second IC independently of the data and allows the data transmission means to operate at a different data transfer rate to the control bus.

In one embodiment, the memory includes a plurality of queues, each for storing data to be transferred to the second IC, label detection means for detecting labels associated with incoming data, and data storage control means for storing data in the queues according to the label associated therewith.

The first IC may further include arrival notification means for notifying the scheduler of the arrival of data at the first IC for transmission to the second IC, and the notification means may be adapted to transmit a notification of the arrival of each data identifying the queue in which the data is stored.

In one embodiment, the second IC includes departure request transmitting means for transmitting a departure request from the second IC to the first IC, identifying the queue from which data is to be output to the second IC, and wherein the data transmission means is responsive to the departure request for transferring data from the identified queue to the second IC.

In one embodiment, the data transmission means comprises a data bus for carrying data from the first IC to the second IC, and a data transmission controller arranged to transfer segments of a data packet from the memory onto the data bus in a plurality of successive time slots. The apparatus may further include a first control bus for carrying control signals from the first IC to the second IC and a second control bus for carrying control signals from the second IC to the first IC. The first IC may further include a control signal transmission controller arranged to transmit a control signal indicating the arrival of a data packet at the first IC and an indication of the queue in which the data packet is stored on the first control bus in a period which is less than or equal to the period required to output all segments of a data packet from the memory. Advantageously, this arrangement allows the scheduler to be notified of the arrival of each new data packet in no more time than is required to transfer a data packet from the first IC to the second IC.

In one embodiment the control signal transmission controller is capable of transmitting control signals each having a different function on the first control bus, and is capable of generating a first signal indicating that a subsequent signal transmitted on the control bus in a predetermined subsequent time slot contains information identifying the queue in which an incoming data packet is stored, and transmitting the first signal on the first control bus in one time slot, and generating a second signal containing the information and transmitting the second signal on the first control bus in the predetermined subsequent time slot. Advantageously, this arrangement enables the same control bus to carry a plurality of control signals each having a different function to allow the number of pins required for carrying the control signals to be reduced.

In one embodiment, the second IC further includes a control signal transmission controller for transmitting a control signal requesting the departure of a data packet from the first IC in a time period of less than or equal to the time period required for outputting all of the segments of a data packet from the memory of the first IC. Advantageously, in this embodiment, all of the control signals (i.e. an arrival notification from the first IC, and a departure request from the second IC) are transmitted between the two ICs in no more time than is required to transmit a single data packet from the first IC to the second IC, thereby permitting each consecutive time slot to be used to transfer data from the first IC to the second IC in a continuous data flow. In one embodiment, the control signal transmission controller of the second IC is adapted for transmission of a plurality of control signals on the second control bus, each having a different function. In one embodiment, the control signal transmission controller of the second IC is adapted for generating a first control signal indicating that a subsequent control signal transmitted on the second control bus in a predetermined subsequent time slot contains information identifying the queue in the memory in which a data packet is requested and transmitting the first control signal on the second data bus in a first time slot, and generating a second signal containing the information and transmitting the second signal on the second control bus in the predetermined subsequent time slot.

In one embodiment, the control signal transmission controller of the first IC may be adapted to generate and transmit on the first control bus in indication of the status associated with a queue. For example the queue status may indicate when a queue in the memory is empty. The control signal transmission controller may be adapted to transmit the queue status signal in the same time slot as the first control signal indicating that a subsequent signal transmitted on the first control bus in a predetermined subsequent time slot contains information identifying the queue of the memory in which an incoming data packet is stored. The second IC may further include correlation means for identifying the queue to which the queue status notification relates based on data transmitted on the data bus.

In one embodiment, the apparatus further includes a code transfer bus for transferring code from the first IC to the second IC and the first IC further includes code transmission means for transmitting error correction code associated with a data packet on the code transfer bus for enabling errors in the data packet to be detected. Advantageously, transmitting error correction code on a separate transfer bus from the data bus can facilitate data transfer, particularly where the data transfer system is arranged to transfer data cells or packets having a bit length of $2^n$, wherein n is an integer. For example, in one embodiment, a data cell having such a length is transferred onto the data bus in a plurality of cell segments, in which each segment is transferred onto the data bus in one of a plurality of consecutive time slots, and sub-segments of each cell segment are transmitted on different channels of the data bus in parallel. The data transfer system may be arranged so that each cell is evenly divided between the bus lines and time slots so that for a given number of time slots, all of the parallel bus lines are required for the transmission of a complete data cell. For example, a cell containing 512 bits may be transmitted in four consecutive 128-bit segments and each segment may be transferred onto the data bus in eight parallel sub-segments each containing 16 bits. Therefore, transmitting the error code, which if added to $2^n$ would result in a number other than $2^n$, on a separate transfer bus, reduces the complexity of the data transmission scheme and permits efficient use of the data bus, so that, for example, all of the data bus channels can be used continuously to carry data traffic, without the need to add padding bits.

The second IC may further include error detection means for detecting errors in data packets transferred from the memory of the first IC to the second IC, based on the error detection code associated with each data packet. The second IC may further include error correction means for correcting detected errors in each data packet before each data packet is output from the second IC.

In one embodiment, the second IC includes departure request transmission means for transmitting a departure request from the second IC to the first IC for causing the first IC to output requested data onto the data bus, and the departure request transmission means is responsive to the detection of errors in data packets to cease transmission of departure requests to the first IC. In this arrangement, if errors in data cells are detected, the transmission of departure requests from the second IC is halted to prevent the first IC transmitting further data packets to the second IC.

In one embodiment, the second IC further includes error notification means for transmitting an error notification to the first IC in response to detecting an error in a data packet transferred from the first IC to the second IC. The error notification means may be used by the first IC to reset the communication interface between the first IC and the second IC so that data transfer can resume.

For example, the second IC may further include synchronization means for aligning data packets transmitted on the data bus with their respective error correction code transmitted on the code transfer bus, and for passing the data packets with their corresponding error correction code to the error detection means, and the first IC may further include synchronization signal transmission means for transmitting a synchronization signal to the synchronization means for enabling the synchronization means to align the data packets and their respective error correction code. Advantageously, this arrangement provides a means of re-synchronizing the transmit and receive side of the communication interface between the first and second ICs if a transmission problem is detected.

In one embodiment, the data transmission means includes a data bus on the first IC comprising a plurality of channels, wherein each channel comprises a converter having an output port and a plurality of parallel bus lines for transmitting data to the converter, and wherein the converter is adapted to convert a parallel data stream carried on the parallel bus lines to a serial data stream at the output port. Advantageously, the conversion of a parallel data stream from the memory to a serial data stream at the output of the first IC for transfer to the second IC enables the number of pins required for outputting data from the first IC to be significantly reduced. Preferably, each converter is adapted to accelerate the data rate of the serial bit stream relative to the rate at which data is carried on one of the single bit lines of the parallel bus lines and preferably, the data rate of the serial bit stream is substantially equal to the data rate of the parallel data stream.

The data transmission means may further include a plurality of converters on the second IC each having an input for receiving a serial data stream output from a respective converter of the first IC and a plurality of parallel bus lines at an output of each converter, wherein each converter is adapted to convert the serial data stream into a parallel data stream. Each converter may be adapted to decelerate the rate at which data is carried on each single bit line of its associated parallel data bus relative to the incoming serial data stream, and may be arranged so that the net data rate of the outgoing parallel data stream is substantially equal to that of the incoming serial data stream.

In one embodiment, the second IC includes receiving means for receiving data from each channel, and for re-transmitting therefrom data placed on the data bus of the first IC in one time slot, if the data is received by the receiving means in a plurality of different time slots. Advantageously, this arrangement provides a means of re-aligning data for re-transmission in the same time slot, that was initially transmitted simultaneously on each data channel of the data bus of the first IC but which during transmission, the data transmitted on different channels is received at the second IC at different times and therefore the data has become time skewed or misaligned. In one embodiment, the receiving means comprises a respective buffer for each channel for storing data received on the channel, detection means for detecting a synchronization signal transmitted simultaneously on each channel from the first IC, buffer control means for initiating the storage of data in the buffer in response to detection of the synchronization signal and for simultaneously transmitting the first received data from each buffer in response to an indication that the synchronization signal has been detected by the detection means for all channels.

The second IC may include a detector for detecting errors in the data and for transmitting a signal to the first IC in response to a detected error, and the first IC may further include means for transmitting a synchronization signal on each data channel in response to the error detection signal. Advantageously, this arrangement provides a means for automatically resetting the communication interface for continued data transfer between the first and second ICs if a transmission problem occurs.

According to another aspect of the present invention, there is provided a method of transmitting data between a first integrated circuit (IC) and a second integrated circuit (IC) comprising the steps of: (a) receiving one or more data cells at the first IC for transmission to the second IC, (b) notifying the second IC of the arrival of the or each data cell, (c) transmitting a departure request from the second IC to the first IC requesting a data cell, (d) transmitting a requested data cell from the first IC to the second IC in response to the departure request, and (e) outputting the requested data cell from the second IC.

According to another aspect of the present invention, there is provided an integrated circuit chip, comprising: a data input for receiving data from an external source, a data output for outputting data received at the data input from the chip, data transmission means for carrying data from said data input to said data output, a control signal output for outputting control signals from the chip, and a control signal generator for generating and transmitting control signals to the control signal output for controlling the transfer of data from an external source to the data output via the data input.

Advantageously, this arrangement provides a circuit on a discrete substrate having at least one data input and a data output and which is capable of controlling the transfer data from one or more external sources, for example external memories which may reside on one or more chips or substrate to the data output via the one or more data inputs. The circuit may include a scheduler for controlling the order in which data is transferred from the external source(s) to the data output. In contrast to known arrangements, in which the memory and scheduler reside on the same chip, the present arrangement allows the scheduler to control the transfer of data to its data output from one or more remote sources, thereby providing flexibility in the size and number of remote sources from which data can be transferred and the transmission of data can be controlled.

In one embodiment, the data input may comprise a parallel port for receiving data from a parallel data bus having a plurality of data transmission channels.

The IC chip may further include means for realigning data transmitted from an external source on a plurality of different channels, if the received data has become time skewed. The IC chip may further include error detection means for detecting errors in the received data prior to transmission to the data output. The data transmission means may include a data pipeline for carrying data.

According to another aspect of the present invention, there is provided an integrated circuit chip, comprising a first data input for receiving data from an external source, a memory for storing the data, a first data output for outputting data from the chip, a control signal input for receiving control signals from an external source for controlling the transfer of data from the memory to the first data output, a second data input for receiving data from an external source, a second data output for outputting data received at the second data input from the chip, a control signal output for outputting control signals from the chip, and a control signal generator for generating and transmitting control signals to the control signal output for controlling the transfer of data from an external source to the second data input.

In one embodiment, the control signal generator includes a scheduler for controlling the order in which data is transferred from the external source to the second data input.

This arrangement provides a communication unit, which is capable of both transmitting data to an external source in response to control signals from the external source and for controlling the transfer of data from the external source to an output of the unit. The integrated circuit chip according to the present invention, may constitute a fundamental component of a bi-directional communication system comprising a plurality of such IC chips, in which the scheduler of each chip controls the transfer of data to the chip from one or more other chips, and the chip is responsive to control signals from the scheduler of one or more other chips to transfer data thereto. Advantageously, the integrated circuit chip may be employed in an expandable switching element in which the number of input ports and output ports of the switching element may be increased by adding additional chips.

According to another aspect of the present invention, there is provided an interface for transmitting data from a first circuit to a second circuit, comprising a data bus, transmitting means for transmitting data onto the data bus, and receiving means for receiving data from the data bus, the data bus including a first plurality of channels, wherein each channel comprises a plurality of parallel bus lines, a first converter for receiving parallel data from the parallel bus lines and converting the parallel data to a serial data stream, a serial bus line coupled to the output of the of the first converter for carrying the serial data stream, a second converter for receiving the serial data stream from the serial bus line and converting the serial data stream into a parallel data flow, a second plurality of parallel bus lines for carrying the parallel data from the second converter to said receiving means, wherein the first converter is adapted to transmit the serial data stream at a higher rate than the rate at which data is transmitted on one of said first plurality of parallel bus lines.

In this arrangement, data for transmission from a first circuit to a second circuit is initially introduced to each channel of the data bus as a parallel data flow and subsequently concentrated by each channel into a serial data flow for transmission to the second circuit. The serial bit stream is transferred at a higher data rate than the data transfer rate over a single bus line of the set of parallel bus lines, and preferably, the data transfer rate over the serial bus line is no less than the net transfer rate over the parallel bus lines of each channel. Advantageously, this arrangement allows data to be transferred a high data rates between one circuit and another, while requiring relatively few pins for data transmission between the circuits, thereby allowing efficient use to be made of the number of pins of an integrated circuit chip.

According to another aspect of the present invention, there is provided an interface for transmitting data from a first device to a second device, comprising storage means for storing data and associated code for detecting an error in said data, a first bus for transmitting data stored in said storage means from said first device to said second device, and a second bus for transmitting code stored in said storage means from said first device to said second device.

In this arrangement, the interface is capable of transmitting data and its associated error detection code on different busses, which can considerably simplify the method used to transmit data and associated code across an interface and facilitates transmission at high data rates.

BRIEF DESCRIPTION OF THE DRAWINGS

Examples of embodiments of the present invention will now be described with reference to the drawings, in which.

DESCRIPTION OF EMBODIMENTS

Figure 1:
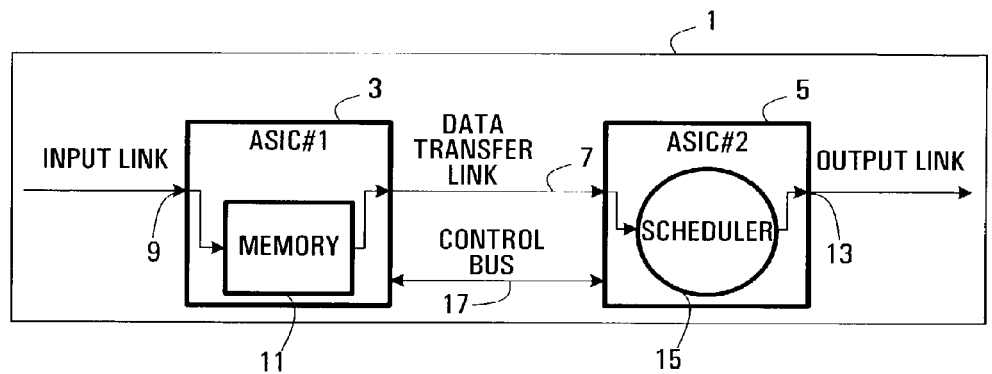
FIG. 1 shows a schematic diagram of a data transmission apparatus according to an embodiment of the present invention.

FIG. 1 shows a data transmission apparatus according to an embodiment of the present invention. The apparatus 1 comprises a first integrated circuit chip 3 and a second integrated circuit chip 5, interconnected by a data transfer link 7 for transferring data from the first IC to the second IC. The first integrated chip 3 includes an input port 9 for receiving data and a memory 11 for temporarily storing the received data. The second integrated circuit chip includes an output port 13 and a scheduler 15 for controlling the transfer of data from the memory 11 of the first IC 3 to the output port 13 of the second IC 5. The apparatus 1 further includes a control bus 17 for passing data transmission control signals between the first IC 3 and the second IC 5. Advantageously, this arrangement provides an interface which allows a scheduler contained on one discrete integrated circuit chip to control the transmission of data to an output port from one or more other discrete integrated circuit chips so that the scheduler is not limited to controlling transmission only from a memory residing on the same chip as the scheduler. This separation of the substrate containing the scheduler and the substrate containing one or more input buffers for temporarily storing data to be scheduled out by the scheduler enables the number and size of input buffers associated with the scheduler to be scaled according to the system requirements. In embodiments in which the scheduler controls the transmission of data from a plurality of discrete integrated circuit chips, an interface may be provided between the IC chip containing the scheduler and each remote IC, for transferring data and data transmission control signals between the scheduler IC chip and the remote ICs, an example of which will be described below in conjunction with FIG. 3.

Returning to FIG. 1, the second IC may include an input port and a memory for receiving incoming data, the interface may be adapted to transfer data from the memory of the second IC, and the first IC may include an output port and a scheduler for controlling the transmission of data from the second IC to the output port of the first IC, to implement bi-directional transfer between the first and second ICs. The scheduler of the first IC may be adapted to control the transmission of data from one or more other integrated circuit chips. As can be appreciated, a plurality of data transmission apparatus can be implemented in a switching element for controlling the flow of data packets or data cells between any number of input ports and output ports.

Figure 2:
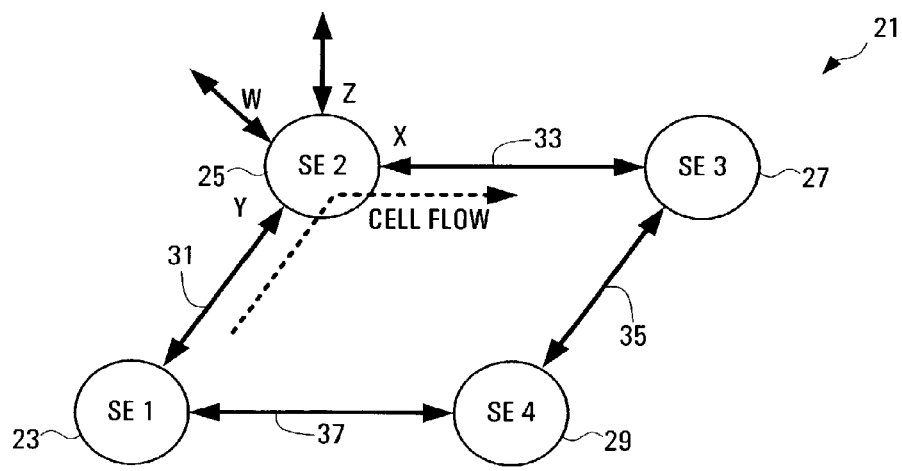
FIG. 2 shows a schematic diagram of a communication system having switching elements, which may incorporate embodiments of the present invention.

FIG. 2 shows an example of a communication system 1 having a plurality of switching elements 23, 25, 27, 29 interconnected by bi-directional communication links 31, 33, 35, 37. Each switching element has at least one input port and at least one output port, and in this example, switching element 25 has four input/output ports W, X, Y, Z. In this embodiment, the switching element 25 is capable of transferring data cells received on any one of its input ports W, X, Y, Z to any of its output ports W, X, Y, Z. For example, data traffic to be transmitted from switching element 23 to switching element 27 may be directed to switching element 25 over link 31, and from switching element 25 to switching element 27 over link 33. In this case, data cells from switching element 23 received at input port Y of switching element 25 are transferred to output port X, and transmitted over communication link 33 to switching element 27.

Figure 3:
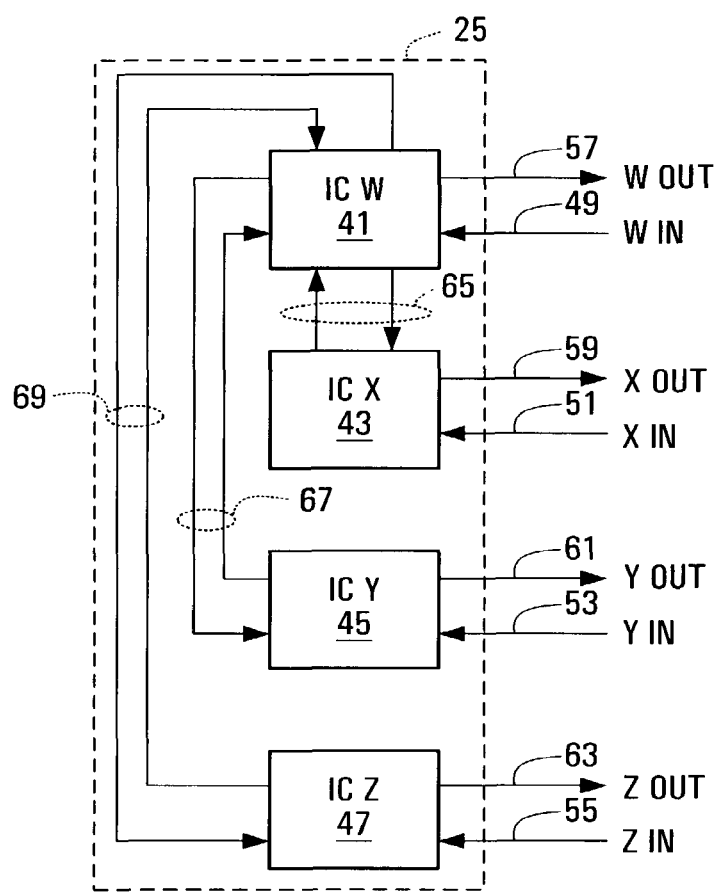
FIG. 3 shows a diagram of a plurality of interconnected transmit/receive integrated circuit chips of a switching element according to an embodiment of the present invention.

Referring to FIG. 3, the switching element 25 includes four discrete integrated circuits 41, 43, 45, 47, each having an input port 49, 51, 53, 55 and an output port 57, 59, 61, 63 for receiving and transmitting, respectively, data cells from and to a network. The switching element further includes a plurality of interfaces for managing the transfer of data cells from one integrated circuit to another. As shown in FIG. 3, the switching element includes interface connections 65, 67, 69 which connect integrated circuit 41 to each of the other integrated circuits 43, 45, 47, respectively, each interface connection allowing data cells to be transferred either from integrated circuit 41 to any other integrated circuit 43, 45, 47 or from the other integrated circuits to integrated circuit 41. In this embodiment, interface connections are also provided between each of the other integrated circuits 43, 45, 47, but these connections have been omitted from FIG. 3 for clarity.

Figure 4:
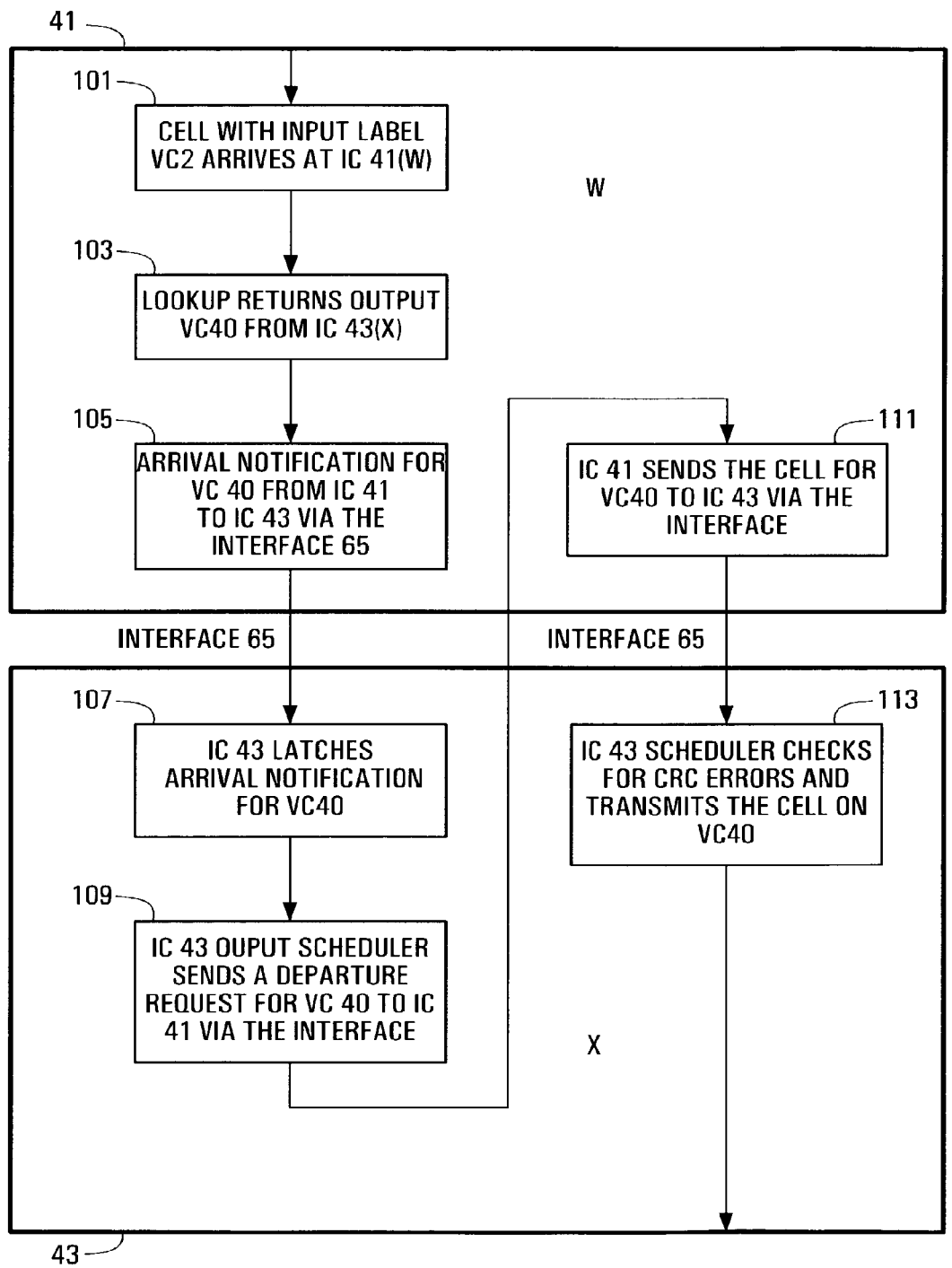
FIG. 4 shows a flow diagram of an example of a hand shaking protocol implemented by an interface for transferring data between integrated circuit chips, according to an embodiment of the present invention.

An embodiment of a hand shaking protocol for managing the transfer of data cells from one integrated circuit to another integrated circuit is shown in FIG. 4. In this example, data is to be transferred from integrated circuit 41 (W) to integrated circuit 43 (X). An example of the steps of the data transfer method performed by each IC 41, 43 is indicated by the steps within each IC block.

At step 101, a data cell arrives at the input port of IC 41 having a flow path identification label "VC 2". In this embodiment IC 41 has a lookup table containing an operating instruction corresponding to the flow path identification label "VC 2" which enables the switching element to apply the appropriate forwarding operation to the data cell. In step 103, IC 41 performs a lookup operation and determines the next label of the flow path to be applied to the data cell and the IC within the switching element to which the data cell is to be transferred. In this example, the next flow path label is identified as "VC 40" and the IC to which the data is to be transferred is determined as IC 43.

At step 105, IC 41 is adapted to send an Arrival Notification (AN) for VC 40 data cells to IC 43 via the appropriate interface 65. In one embodiment, the cell retains its original i.e. input flow path label (in this case 'VC2') and is stored in a memory or a portion of memory, which may be reserved for cells destined for a particular outgoing flow path, in this example VC 40.

At step 107, IC 43 latches the Arrival Notification for the output flow path VC 40, and then, in step 109, the scheduler of IC 43 sends a Departure Request (DR) via the interface to IC 41 for a data cell destined for the required output flow path VC 40, for example, by identifying the output flowpath e.g. and/or the memory address that stores data cells for that flow path.

In response to the Departure Request, IC 41 sends the data cell for VC 40 to IC 43 via the interface 65. On receiving the data cell, IC 43 checks the data cell for errors, which in this embodiment is performed by an error detection circuit, and which may use a Cyclic Redundancy Check (CRC) method. If the data cell passes the check, the data cell is forwarded to the scheduler, which then transmits the data cell onto the appropriate flow path. However, if it is determined that a predetermined number of data cells fail(s) the CRC, action will be taken to reset the interface before attempting to transfer further data, as will be described below. The number of data cells which must fail an error check before the interface is reset may be defined as required, and may be any suitable number, for example one, or any number greater than one, and the number may be defined, for example, as consecutive failures, or as a percentage or fraction of failures.

Figure 5:
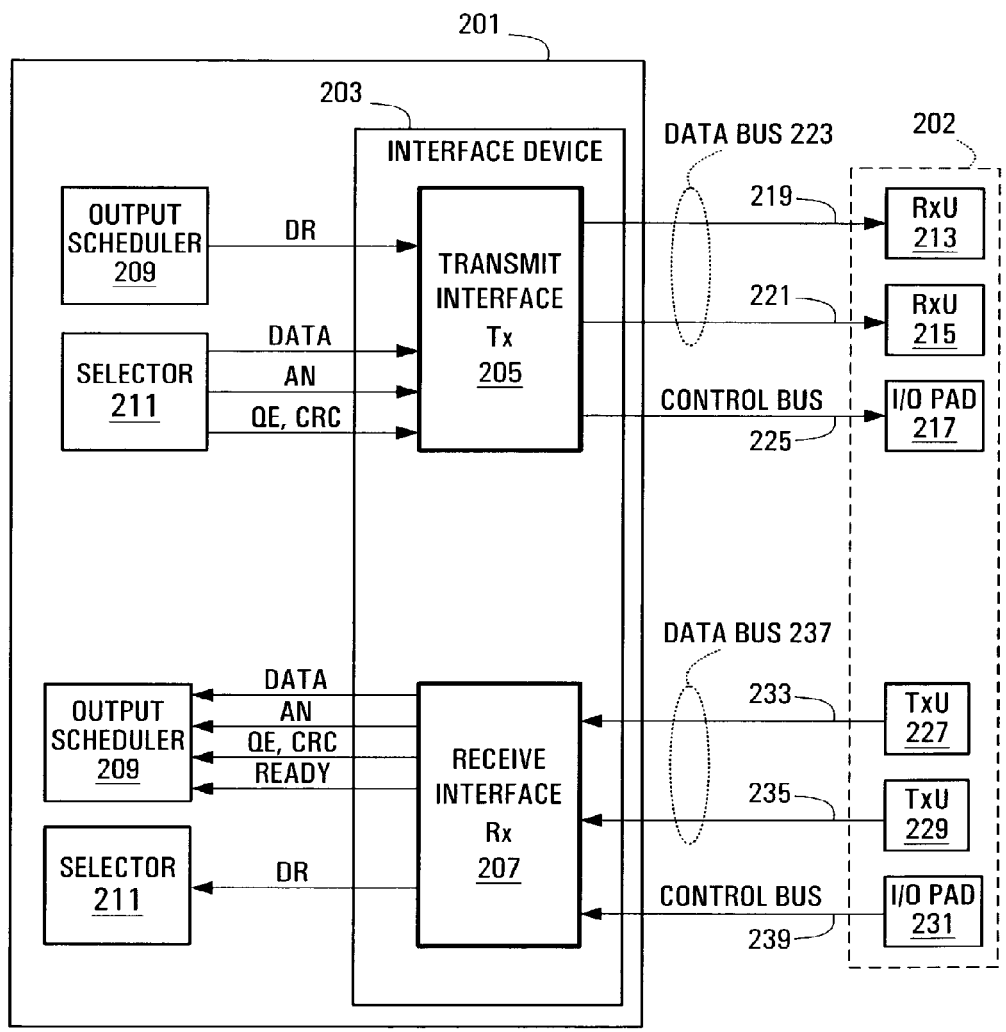
FIG. 5 shows a block diagram of an integrated circuit having a transmit and receive interface, according to an embodiment of the present invention.

To implement bi-directional data cell transfer between integrated circuits, each integrated circuit chip has at least one interface device that includes a transmit interface for sending data to another IC and a receive interface for receiving data from that other IC. Thus, the transmit interface of one IC is coupled to the receive interface of another IC. An embodiment of an interface device and modules with which the interface device is connected is shown in FIG. 5. Referring to FIG. 5, an integrated circuit die 201 includes an interface device 203 having a transmit interface 205 and a receive interface 207. The transmit interface 205 is connected to an output scheduler 209, and a selector module 211, associated with the IC 201, a plurality of receive modules 213, 215 and an I/O pad 217 of a receive interface of another IC die 202. The transmit interface 205 is connected to the receive modules 213, 215 via respective data channels 219, 221 of a data bus 223. The transmit interface is connected to the I/O pad 217 via a control bus 225, which, in one embodiment, may comprise a single data rate (SDR) bus, and which may operate at 156.25 MHz. The output scheduler 209 is responsible for managing the transfer of data to its associated IC 201 from one or more other ICs, and for managing the transmission of the transferred data from one or more outputs from the IC 201. In this embodiment, the output scheduler 209 is adapted to pass departure requests (DR) to the transmit interface 205 for transmission by the transmit interface to the receive interface of another IC 202, via the control bus 225.

The selector module 211, which may also reside on the IC 201, is adapted to pass data, arrival notifications (AN), queue-empty (QE) status and code associated with the data for enabling errors in the data to be detected, to the transmit interface 205 from a selected one of a plurality of different sources, for example different portions of memory or different memory modules (not shown), which may also reside on the IC 201. In one embodiment, the storage of data cells in memory, their dispatch in response to departure requests, the transmission of error correction code, arrival notifications, and queue empty status messages may be controlled by a controller (e.g. a queue manager), (not shown), and which may also reside on the IC chip 201. The transmit interface 205 is adapted to transmit to the receive interface of another IC 202, arrival notifications and associated information over the control bus 225, data over the data bus 223, associated code over the control bus 225 and queue-empty status messages over the control bus 225, as will be described in more detail below.

The receive interface 207 is connected to the output scheduler 209 and the selector module 211, which are the same as those to which the transmit interface 205 is connected, but are duplicated in FIG. 5 for clarity. The receive interface 207 is also connected to a plurality of transmit modules 227, 229, and a second I/O pad 231 of a transmit interface associated with the other IC 202. The receive interface 207 is connected to the transmit modules 227, 229 via a plurality of respective data channels 233, 235 of a second data bus 237. The receive interface 207 is connected to the second I/O pad 231 via a second control bus 239, which may also comprise a single data rate (SDR) bus, and which may operate at 156.25 MHz. The receive interface 207 receives from the other IC 202, arrival notifications and associated information over the second control bus 239, data over the second data bus 237, code associated with the data, for enabling errors in the data to be detected, over the second control bus 239, and queue-empty status messages, ready signals and departure requests over the second control bus 239, and transmits the arrival notifications, data, associated code, queue-empty status messages, and ready signals to the output scheduler 209, and transmits departure request messages to the selector module 211, which passes the departure request to the appropriate data source (e.g. memory). In one embodiment, a controller (e.g. queue manager) may be provided, and which may reside on the IC 201 to control the output of data in response to the departure requests.

Figure 6:
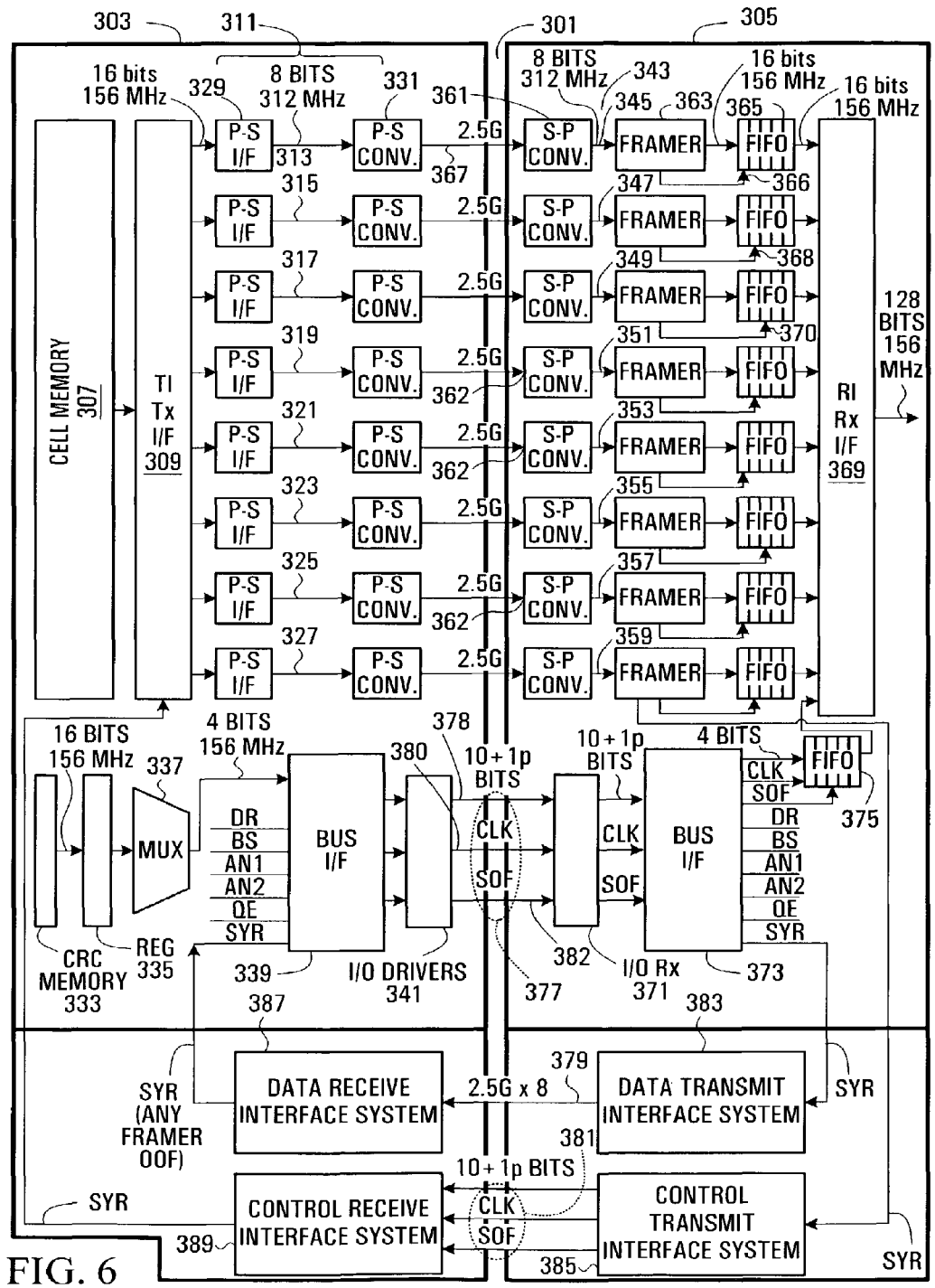
FIG. 6 shows a block diagram of an interface arrangement for passing data between two integrated circuit chips, according to an embodiment of the present invention.

An embodiment of an interface for transferring data between two integrated circuit dies is shown in more detail in FIG. 6. Referring to FIG. 6, an interface, generally shown at 301, is provided to manage the transfer of data cells from a first integrated circuit (IC) 303 to a second integrated circuit (IC) 305. The first IC 303 includes a memory or buffer 307 for storing data cells to be transferred to the second IC 305, a transmit interface (TI) 309 coupled to the memory 307 for processing data cells prior to their transmission to the second IC 305, as will be explained below, and a data transmission system 311 comprising a plurality of, and in this embodiment, eight parallel transmission channels, 313, 315, 317, 319, 321, 323, 325, 327. In this embodiment, each transmission channel includes a parallel to serial converter interface (P-S I/F) 329 coupled to the transmit interface 309, and a parallel to serial (P-S) converter 331 coupled to receive data from the converter interface 329, and to output data from a data output port of the first IC die 303.

In this embodiment the transmit interface 309 is adapted to transmit a parallel data stream to the converter interface 329 of each channel. The converter interface is adapted to convert the parallel data stream into a plurality of higher speed serial bit streams and transmit the serial bit stream to the P-S converter 331. The P-S converter 331 is adapted to convert the plurality of serial bit streams into a high speed single serial bit stream, and may comprise, for example, an IBM Unilink™ device, or any other suitable device, which can perform this function. Preferably, both the converter interface and the P-S converter operate such that the net output data rate is the same or substantially the same as the net input data rate.

The components of the interface 301 contained within the first integrated circuit 303 further includes a second memory 333 for storing cyclic redundancy check bits (CRC) associated with each data cell stored in the cell memory 307 (or other codes for enabling data error checking), a register 335 coupled to the output of the second memory 333, a multiplexer 337 coupled to the register 335, a control bus interface 339 coupled to the multiplexer 337 and a control bus I/O driver module 341, which may, for example, include LV-CMOS (Low Voltage CMOS) 1.8V I/O drivers, for driving control signals at control signal output ports of the first IC 303.

The components of the interface 301 contained within the second IC 305 include a parallel interface system 343 having a plurality of, and in this embodiment, eight parallel receive channels 345 to 359, each of which includes a Serial to Parallel (S-P) converter 361 connected to a data input port 362 of the second IC, a framer 363 and a FIFO register 365. The output of S-P converter 361 of the second IC 305 is connected to the output of a respective P-S converter 331 of the first IC 303 via a link 367. The interface 301 further includes a receive interface (RI) 369 within the second IC 305, coupled to receive data from each FIFO register 365.

The S-P converter 361 of each channel is adapted to convert the serial bit stream received from the output port of the P-S converter 331 of the first IC 303 into a parallel data stream for transmission to the framer 363. The net data rate of the output of the S-P converter 361 is preferably the same as the net input data rate and therefore the bit rate of each single bit line of the parallel output port of the converter 361 is less than the bit rate of the incoming serial data stream, depending the width of the parallel data stream, and for example, the bit rate of each single bit stream of the parallel data stream may be equal to the bit rate of the incoming serial data stream divided by the bit width of the parallel data stream. The S-P converter 361 may for example comprise an IBM Unilink™ device, or any other suitable device, which can perform the desired function.

The framer 363 of each channel may be adapted to convert the parallel data stream from the S-P converter 361 to a second parallel data stream for transmission to the FIFO buffer 365, in which the second parallel data stream has a greater bit width than the incoming parallel data stream, thereby allowing the bit rate of each single bit line of the parallel output port of the framer to be reduced relative to that of the incoming parallel data stream, and for example, the rate may be reduced by the ratio of the bit width of the incoming parallel data stream to the bit width of the outgoing parallel data stream. In one embodiment, the S-P converter may be arranged such that the output parallel data stream has the same bit width as the incoming data stream to the P-S converter 331, and the framer 363 may be arranged such that the output parallel data stream therefrom has a bit width equal to the parallel data stream received by the P-S converter interface 329.

The data transmission interface operates such that data is read from memory in parallel at a first clock rate (for example, the local clock rate of the first IC) is divided into portions of parallel data, each portion being converted into a high speed serial bit stream for transmission from the first IC to the second IC, and each serial bit stream is then converted back into a parallel data stream having the same width as the data read in parallel from the memory of the first IC, allowing the clock rate of the reconverted parallel data stream to be the same as that of the first IC.

The components of the interface contained within the second IC 305 further include a control bus I/O receiver module 371, which may, for example, comprise LV-CMOS 1.8V drivers, a control bus interface 373 and a FIFO register 375. A control bus 377 couples the I/O pad 341 of the first IC 303 to the I/O pad 371 of the second IC 305.

The interface 301 further comprises a second data bus 379 and a second control bus 381 for transmitting data cells and control and other signals, respectively from the first IC to the second IC. The second IC includes data and control signal transmission circuits 383, 385, which may be the same or similar to the transmission circuitry contained in the first IC 303 described above, and the first IC 303 includes data and control signal receive circuits 387, 389, which, again may be the same or similar to the receive circuitry of the second IC 305, described above.

In this embodiment, the interface 301 is arranged to transfer data cells (cell header plus pay load) and the associated cyclic redundancy check bits over separate interface systems. Advantageously, this arrangement allows the rate of data cell transfer across the interface to be unaffected by the provision of a CRC, which would otherwise reduce the available data transfer rate if the CRCs were included with the data cells. Furthermore, where the bit width of the data is much larger than the bit width of the error detection code such that, for example, the combined bit width ≠2$^n$, where n is an integer, transmitting the code separately considerably simplifies the data transmission scheme, particularly the subdivision of the data for transmission on separate transmission channels and the segmentation of the data for transmission in a plurality of successive time slots.

In one implementation, the interface 301 is adapted to transfer data cells (cell header plus pay load) of 512 bits at a rate of 20 Gigabits per second across the interface. In the present embodiment, 128 bits are read out in parallel from the cell memory 307 to the transmit interface 309 at a rate of 156.25 MHz, which permits a 512-bit cell to be transferred over four read cycles. The transmit interface 309 divides the 128 bits into eight 16-bit segments and outputs each of the eight 16-bit segments onto one of the eight data transmission channels 313 to 327. Each 16-bit segment is transmitted from the transmit interface 309 to the P-S converter interface 311 over a 16-bit parallel bus at a rate of 156.25 MHz. The P-S converter interface 329 transmits the 16-bit segments to the P-S converter 331 over an 8 bit parallel bus at twice the rate, i.e. 312.5 MHz, and the P-S converter core transmits the 16-bit segment over a serial (i.e. single bit) data bus to the S-P converter 361 of the second IC 305, at a rate of 2.5 GHz. Each S-P converter 361 on the receive side of the interface 301 forwards the 16-bit segment to a respective framer 363 over an 8-bit parallel bus at a rate of 312.5 MHz, and the framer 363 forwards the 16-bit segment to a respective FIFO register 365 over a 16-bit parallel bus at a rate of 156.25 MHz. Each 16-bit segment is read out of each FIFO register 365 to the receive interface 369 over a 16-bit parallel bus at a rate of 156.25 MHz.

This arrangement of data bus transmission channels, in which the transfer of each segment is changed from parallel transmission from the transmit interface 309 to serial transmission across the interface between the first and second ICs 303, 305 and from serial to parallel on the receive side, allows the data transfer rate to be maintained through all portions of the data bus while substantially reducing the number of pins of each IC required for data transfer. In the present embodiment, 16 pins are required; two pins per data transfer channel.

The second data transfer interface, for transferring data from the second IC 305 to the first IC 303 comprising the second data bus 379, and the data transmit and receive interface systems may operate in the same way as the first data transfer interface described above.

In the present embodiment, both the first and second control bus interfaces are required for the management and control of a one-way data transfer between the first and second ICs 303, 305. For data transfer from the first IC 303 to the second IC 305, the first control bus interface 339 is adapted to transmit to the second IC 305, arrival notifications and information associated therewith, error correction code associated with the data being transferred, queue empty status messages and synchronization request messages. The second control bus interface is adapted to transmit from the second IC 305 to the first IC 303, departure requests, and associated information, identifying the portion of memory of the first IC from which data is to be transferred to the second IC.

Similarly, for data which is to be transferred from the second IC 305 to the first IC 303, the second control bus interface is adapted to transmit from the second IC to the first IC, arrival notifications and associated information, notifying the first IC of incoming data which is to be transferred across the second data bus, error correction code associated with the data which is being transferred from the second IC to the first IC, queue empty status messages, and synchronization requests. The first control bus interface is adapted to transmit departure requests and associated information identifying the portion of memory in the second IC 305, from which data is to be transferred to the first IC 303.

In the present embodiment, the first and second control bus interfaces 339 are capable of transmitting information on eleven serial bit lines of the control bus 377. The first and second control bus interfaces operate to transfer information across the control interface at a clock rate which corresponds to the clock rate at which data is transferred from the transmit interface 309 to the P-S converter interface 329, and which in this illustrative embodiment is 156.25 MHz.

The eleven serial bit lines of each control interface include four serial bit lines for carrying four CRC bits in parallel, six serial bit lines for carrying control signals and a serial bit line for carrying a parity check bit. In this embodiment, two of the control bit lines carry an arrival notification bit, AN1, AN2, which indicate the arrival of data at one of two different locations, for example, two different groups of queues for storing incoming data cells, which are to be transferred to the other IC. Two further control bus serial bit lines are used to transmit information associated with departure requests to request data to be transferred from the other IC and include a departure request (DR) bit, signifying a request for data from the other IC, and a buffer select (BS) bit which identifies one of two locations of the other IC from which the data is being requested. Another of the control bus serial bit lines is used to transmit a queue-empty (QE) bit which is used to indicate to the scheduler of the other IC that a particular queue (or buffer) for temporarily storing incoming data is empty, and another of the interface bus serial bit lines is used to carry a synchronization request (SYR) bit that is used to re-synchronize the interface. The control bus interface is also adapted to transmit over the six control bus lines, information associated with an arrival notification, identifying the particular queue in which a particular incoming data cell has been stored, and information associated with a departure request, identifying the particular queue from which a data cell is being requested. In this embodiment, the control bus includes two further lines, one of which (CLK) carries clock pulses from the first IC to the second IC for detection of the control signals, and the other (SOF) is used to carry a synchronization signal for synchronizing the interface. The function and purpose of the various control signals transmitted on the control bus will be described in more detail below.

Transmit Interface Block

Figure 7:
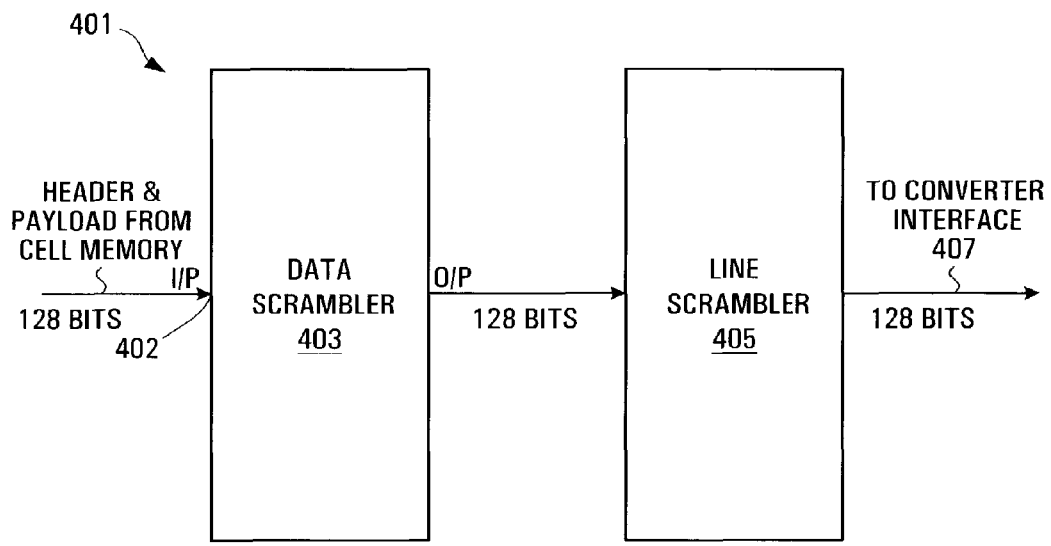
FIG. 7 shows a block diagram of a transmit interface according to an embodiment of the present invention.

FIG. 7 shows an embodiment of a transmit interface block, which may be implemented as the transmit interface block 309 of the embodiment of FIG. 6. Referring to FIG. 7, a transmit interface block 401 comprises an input 402 for receiving data cells from a cell memory (e.g. 307 shown in FIG. 6), a data scrambler 403, a line scrambler 405 for receiving data from the data scrambler, and an output 407 for transmitting data from the line scrambler 405 to the P-S converter interface (for example, interface units 329 shown in FIG. 6). The line scrambler 405 is used to provide a sufficient frequency of transitions between high and low states (i.e. edge density) required by the converter Clock Recovery System (CDR). The data scrambler 403 is used to protect against malicious users who may try to match the line scrambler's sequence thereby possibly reducing the edge density below the level required for proper operation of the converter CDR circuit.

Figure 8:
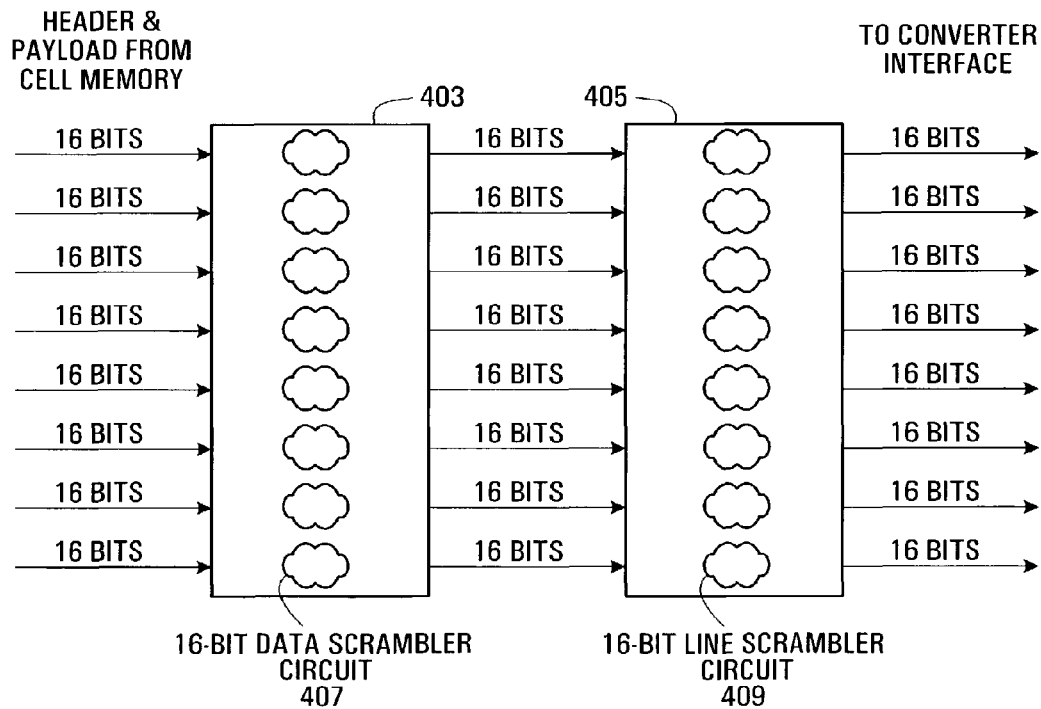
FIG. 8 shows an example of the transmit interface of FIG. 7, in more detail.

FIG. 8 shows an embodiment of a transmit interface block in more detail. In this embodiment, a data cell received from the cell memory is subdivided into cell segments and each cell segment is scrambled separately. Advantageously, this arrangement reduces the complexity and number of layers of combinational logic required to implement a line or data scrambler of larger width.

Referring to FIG. 8, the data scrambler 403 has eight data scrambler circuits 407, each of which receives and separately scrambles one of eight 16-bit cell segments. The line scrambler 405 also includes eight line scrambler circuits 409, each for scrambling a 16-bit cell segment received from a respective data scrambler circuit 407. Each of the scrambled 16-bit cell segments are output from each line scrambler circuit to the converter interface.

In one embodiment, a single linear feedback shift register (LFSR) may be provided for each of the data scrambler 403 and line scrambler 405. In this case, the same scrambling sequence contained in the LFSR associated with the data scrambler is applied to each of the eight 16-bit data scrambler circuits, and another scrambler sequence contained in the other LFSR associated with the line scrambler is applied to each of the line scrambler circuits. In one implementation, the scrambler sequence is XORed with the 16-bits to be scrambled, the result of which constitutes the scrambled cell segments (i.e. 16-bit word).

Receive Interface Block

Figure 9:
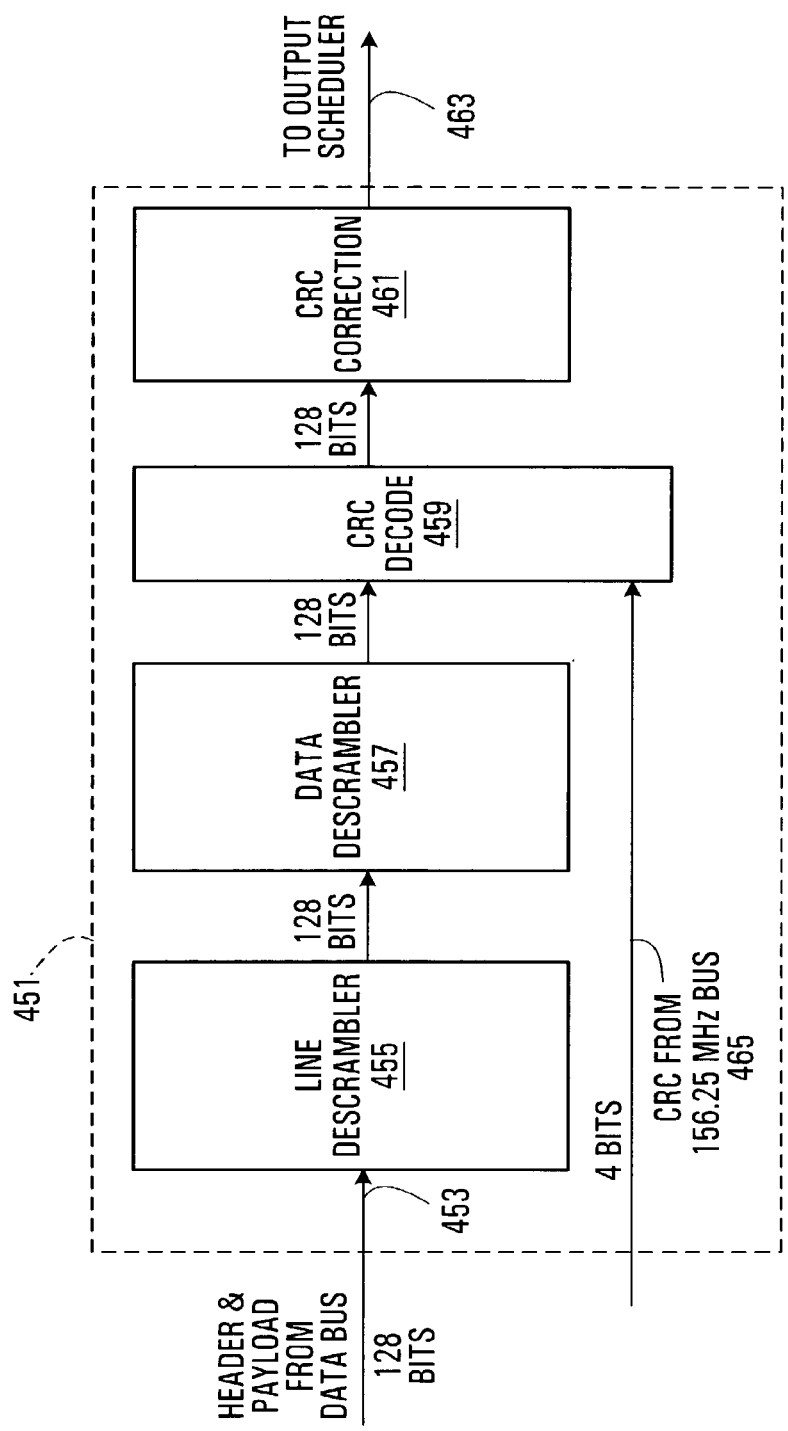
FIG. 9 shows a block diagram of a receive interface according to an embodiment of the present invention.

An embodiment of a receive interface block which may be implemented as the receive interface 369 of the embodiment of FIG. 6, is shown in FIG. 9. Referring to FIG. 9, a receive interface block 451 comprises an input 453 for receiving scrambled data cells (header and pay load), for example transmitted over a data bus or data transmission system (e.g. as shown in FIG. 6), a line de-scrambler 455 for de-scrambling scrambled data cells according to a predetermined line scrambler/de-scrambler sequence, a data de-scrambler 457 for receiving data cells from the line de-scrambler 455 and applying a data de-scrambling sequence to recover the original data, a CRC de-coder 459 for receiving the recovered data from the data de-scrambler 457 and for receiving CRC code (for example, transmitted over the CRC and control interface shown in FIG. 6) and detecting errors in the data, a CRC correction unit 461 for correcting errors in the transmitted data, and an output 463 for outputting the transmitted data cells to an output scheduler (not shown).

In this embodiment, the receive interface is responsible for the following functions.

The line de-scrambler 455 is adapted to perform a line de-scrambling operation on data cells received from the transmitting IC, which is essentially the inverse of the line scrambling operation performed by the line scrambler 405 of the transmit interface block 401.

The data de-scrambler 457 is adapted to receive data cells from the line de-scrambler and perform a data de-scrambling operation on the data cells, which again is essentially an inverse operation performed by the data scrambler 403 of the transmit interface block 401. Data cells output from the data de-scrambler should have the form of the original data cell prior to its transmission across the interface.

The CRC decoder block 459 receives de-scrambled cells forwarded by the data de-scrambler 457 and also receives CRC code associated with the data cell to enable the decoder to check for errors. In this embodiment, the CRC code is transmitted on the control bus without passing through scrambler/descrambler circuitry. The decoder 459 checks each cell for CRC errors, and generates a cell status report that indicates (a) that there was no error present, or (b) that a single bit error occurred and an identification of which bit is in error, or (c) that an error occurred in more than one bit. As mentioned above, in one embodiment, data cells are transmitted across the interface in segments, and in a particular example, a data cell of 512 bits is transmitted in four successive segments of 128 bits each. The CRC code for each 512 bit data cell contains 16 bits, and may also be transferred across the control interface in four successive segments of four bits each. The control bus interface may be arranged to transmit each of the four bits of CRC code simultaneously with each 128-bit data cell segment of the associated data cell. The CRC decoder block re-unites the 16-bit CRC code with the cell header and pay load for CRC checking.

The CRC correction block 461 is adapted to receive the data cell, including cell header and pay load, and an indication identifying any bits requiring correction from the CRC decoder, and to correct any single bit error before the data cell is handed off to the output scheduler. In one embodiment, the CRC code is discarded after the CRC decode block 459, as it is no longer required.

A new CRC is preferably generated prior to transmission of the cell from the output scheduler as the original routing information, e.g. VC (Virtual Channel) number, in the cell header is replaced with new routing information, e.g. a new VC number, prior to its output from the IC chip.

In one embodiment of a receive interface block, at least one of the line and data de-scramblers may include a plurality of de-scrambler circuits, each of which operates on a sub-segment of the transmitted data cell. Advantageously, this arrangement reduces the complexity and number of layers of combinational logic required for a line or data de-scrambler designed to operate over the entire cell width. An example of such a receive interface block is shown in FIG. 10.

Figure 10:
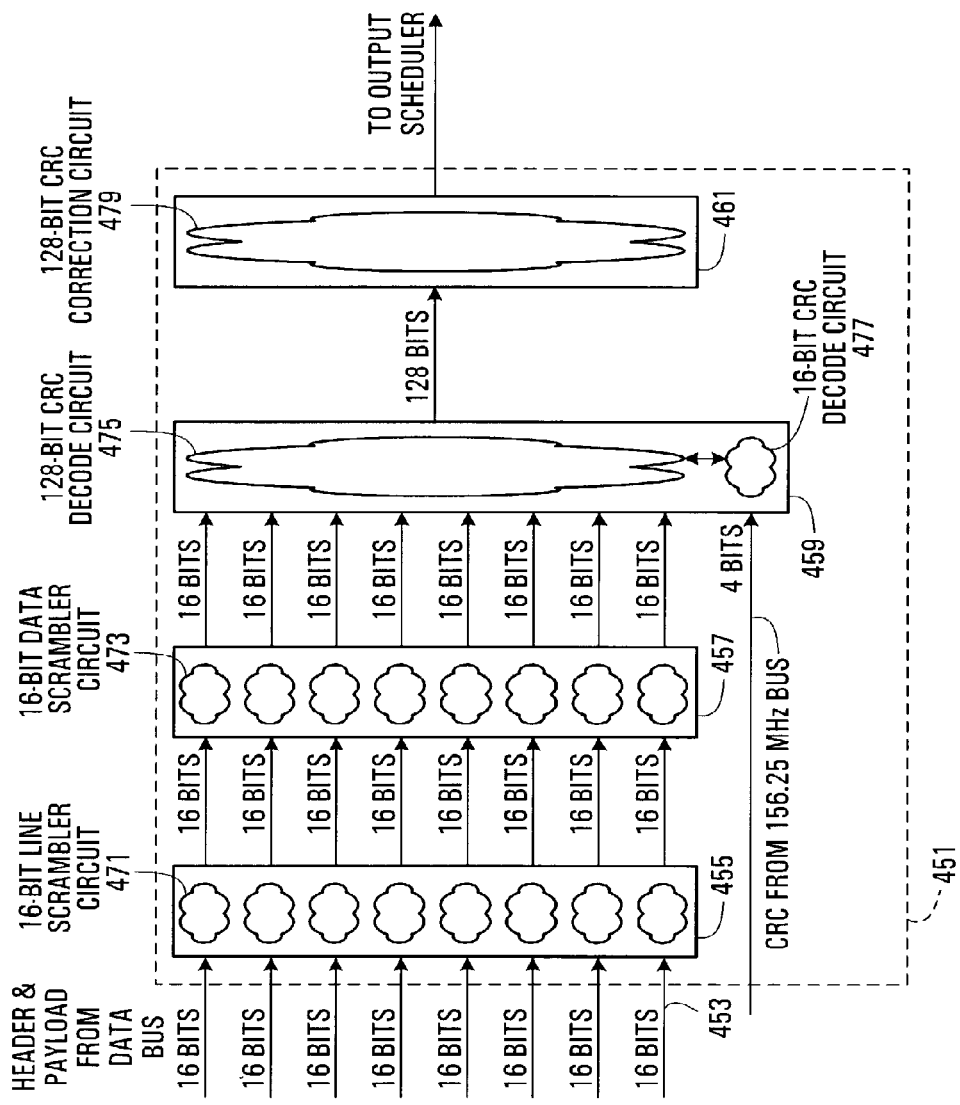
FIG. 10 shows an example of the receive interface of FIG. 9, in more detail.

Referring to FIG. 10, the input 453 of the receive interface block 451 comprises eight 16-bit parallel buses, each for carrying 16 bits of a 128-bit wide data cell, for example forwarded from each of the FIFO registers 365 of the interface shown in FIG. 6. The line de-scrambler 455 comprises eight 16-bit line de-scrambler circuits 471, each adapted to receive and perform a line de-scrambling operation on 16 bits of the 128-bit wide data cell.

In this embodiment, the data de-scrambler 457 comprises eight 16-bit data de-scrambler circuits 473, each for performing and applying a data de-scrambling operation on each of the 16-bit cell segments forwarded from each of the line de-scrambler circuits 471.

In this embodiment, the CRC de-coder 459 has a single 128-bit CRC de-code circuit 475 for receiving the eight 16-bit cell segments from each of the data de-scrambler circuits 473 of the data de-scrambler block 457. The CRC computation may be performed across the width of the entire data cell, and the CRC decoder circuit 475 is arranged to operate on the 128-bit data. The CRC de-coder block also includes a 16-bit CRC de-code circuit 477.

The CRC correction block 461 has a single 128-bit CRC correction circuit 479 capable of performing CRC correction on 128-bit data. Although, in other embodiments, the CRC de-coder block and/or the CRC correction block may include a plurality of de-code circuits and correction circuits, respectively, generally, the CRC de-code and correction logic can be implemented quite readily for 128-bit wide data.

Control Interface Bus

Referring back to FIG. 6, the signalling and operation of the control bus that controls the transfer of data from one IC to another IC will now be described in more detail.

In one implementation, the interface shown in FIG. 6 is adapted to transfer data cells of 512 bits from one IC to another IC over four clock cycles so that 128 bits of a data cell are transferred per cycle. Although other embodiments of the interface may be arranged to transfer data cells having other lengths, and over any other number of clock cycles, for the purpose of illustration, operation of the interface will be described in the context of a 512-bit data cell transfer over four clock cycles.

Error Code Transfer

Referring to FIG. 6, a CRC code associated with each data cell is separated from the data cell and stored in a separate memory 333. When a cell is read out from memory 307, the associated 16-bit CRC code is read out from the CRC code memory, placed in the register 335, and four bits of the CRC code are read out at a time by the multiplexer 337. The control bus interface 339 receives each four bit segment of the a 16-bit CRC code from the multiplexer 337 and transfers each four bit CRC code segment across the control bus 377 simultaneously with each 128-bit data cell transferred across the data bus.

AN1 Control Signal

When a data cell is received by the first IC from a first source or class of sources (e.g. communication path(s) whose header (e.g. VC number) indicates that the data cell is destined for re-transmission by the second IC, the first IC indicates the arrival of the data cell by applying a signal on the AN1 line of the control bus. For example, the arrival notification may be represented by a single bit, which sets the AN1 line to indicate the arrival of a new data cell. The AN1 control signal may be controlled by a queue manager associated with the memory or part of memory in which data cells from the first source is stored. In one embodiment, the arrival notification is sent to the second IC on cell arrival only. The AN1 signal may also be used to indicate to the second IC that a subsequent signal on certain preselected control bus lines contains information identifying the queue or part of memory in which the newly arrived data cell is stored.

AN2 Arrival Notification

When the first IC receives a data cell from a second source or class of sources (e.g. communication path(s)) whose header (e.g. VC number) indicates that the data cell is destined for re-transmission by the second IC, a signal is sent from the first IC to the second IC on the AN2 line of the control bus. The AN2 notification may be represented by a single bit and sent to the second IC by setting the AN2 line. The AN2 control signal may be controlled by a queue manager associated with the memory or part of memory in which data cells from the second source is stored. In one embodiment, an AN2 arrival notification is sent to the second IC on cell arrival only. The AN2 signal may also be used to indicate to the second IC that a subsequent signal on certain preselected control bus lines contains information identifying the queue or part of memory in which the newly arrived data cell is stored.

DR-Departure Request

When the scheduler of the second IC requests a data cell from the memory of the first IC, a signal indicating a departure request is sent from the second IC to the first IC by the second control bus interface. The departure request may be represented by a single bit and is implemented by setting the DR line of the second control bus for passing control signals from the second IC to the first IC.

The DR signal may also be used to indicate to the first IC that a subsequent signal on certain preselected control bus lines contains information identifying the queue or part of memory of the first IC from which a data cell is requested.

BS-Buffer Select

The buffer select line is used in conjunction with the departure request line to identify one of two input buffers or groups of queues or portions of memory to which the departure request applies. For example, when the departure request bit is set, a low or cleared buffer select line may indicate that the requested cell is in a first input buffer, and a high or set BS line may be used to indicate that the requested cell is in a second input buffer. On the other hand, the inverse of this buffer select line signalling may be implemented.

The DR and BS signals may be controlled by the output scheduler.

It is to be noted that in a bi-directional communication system, in which the first IC also has an output scheduler, and the second IC has a memory for storing data to be transmitted to the first IC, DR and BS signals may be transmitted on the first control bus under the control of the first IC output scheduler, requesting the transmission of data from the second IC, and are controlled independently of the arrival notification signals.

SYR-Synchronization Cell Request

A synchronization cell request is used to initiate a sequence of steps that serve to synchronize receipt by the receive interface block of data cell segments transmitted across the (eight) channels of the data bus. The synchronization cell request may also be used to synchronize transmission of data cells and its associated error correction code across the interface. A synchronization cell request signal is transmitted on the SYR line of the control bus by the second IC when the second IC requires synchronization with the first IC. This signal may be dispatched on initial start-up, or for example, when the second IC detects an out-of-sync state, which may be indicated by, for example, a CRC check failure of a received data cell. The synchronization cell request may be represented by a single bit and signalled by setting the SYR line of the control bus.

Advantageously, the interface may be adapted such that the departure request line is cleared when a synchronization request signal is placed on the control bus. This arrangement ensures that departure requests and synchronization cell requests are mutually exclusive so that, if a receive framer is out-of-frame (OOF), a synchronization cell request will take priority over a departure request. In this case, all departure requests from the output scheduler will be discarded until the receive interface is in-frame. Holding the departure request line low may be implemented by causing the output scheduler to insert a null cell in place of the discarded departure request. Once the output scheduler receives a signal indicating that the receive interface is in-frame, the discarded departure request may be re-transmitted and the requested cell transferred across the interface.

QE-Queue-Empty

A Queue-Empty signal is sent on the control bus from the first to the second IC to indicate that there are no more cells in the queue of the first IC from which the current cell being sent in parallel with the queue empty signal has been output. A Queue-Empty status may be represented by a single bit and indicated by setting the QE line of the control bus. The Queue-Empty status is used by the output scheduler to update its register, which indicates the status of each queue (i.e. either empty or occupied), and from which the next queue from which to request data is determined, for example, by calculating the next queue register pivot position. Each queue of the or each input buffer may have an associated address corresponding to the output flow path label or identifier (e.g. VC number).

In other embodiments, the second IC may be adapted to correlate the Queue-Empty signal with a particular queue in the first IC using any other suitable methodology and which does not necessitate the QE signal being transmitted from the first IC with the last data of that queue. For example, the timing of the dispatch of a QE signal from one IC may be based on a Departure Request from another IC.

VC Number Departure Request

The VC Number Departure Request is a signal placed on the control bus identifying the VC number of the queue from which a data cell is requested for transmission over the interface and is associated with the Departure Request (DR) and Buffer Select (BS) signals. The VC Number Departure Request is transmitted from the requesting IC under the control of the output scheduler, and is therefore, for example, transmitted on the first control bus if the requesting IC is the first IC (in FIG. 6) or on the second control bus if the requesting IC is the second IC (in FIG. 6). In one embodiment the VC Number Departure Request is placed on any one or more of the six lines of the control bus described above (i.e. DR, BS AN1, AN2, QE and SYR lines). For example all six lines may be used to transmit the VC Number Departure Request, enabling the scheduler to access $2^6$ or 64 different queues (and in this case, the 6 control lines serve as a parallel control bus to carry a 6-bit VC Number Departure Request word). Where any one or more of these lines of the control bus are used to carry the VC Number Departure Request, the VC Number Departure Request is transmitted in a different clock cycle to the other control signals, as described below.

VC Number AN1

The VC number AN1 is a signal that identifies the VC number of the queue in which a new data cell has arrived from the first source of data (e.g. a class of input link) and is associated with the arrival notification signal AN1. The VC Number AN1 may be transmitted under the control of the queue manager associated with the memory or part of memory in which data from the first source is stored. In one embodiment, the VC number AN1 is transmitted on any one or more of the six lines of the control bus described above (DR to SYR lines) and may be transmitted as a parallel word of up to six bits. This allows the VC number AN1 to specify up to 64 different queues within a first input buffer or memory identified by AN1.

Where the VC number AN1 is transmitted on the DR to SYR control bus lines, the VC number AN1 is transmitted in a different clock cycle to the other control signals, as be described below.

VC Number AN2

The VC number AN2 is a signal that identifies the VC number of the queue in which a new data cell has arrived from a second data source (e.g. a class of input link) and is associated with the arrival notification signal AN2. The VC Number AN2 may be transmitted under the control of the queue manager associated with the memory or part of memory in which data from the second source is stored, and independently of VC Number AN1 signals. The VC number AN2 may be transmitted on any one or more of the six lines of the control bus described above (i.e. DR to SYR) and may be transmitted as a parallel word of up to six bits wide, allowing 64 different queues to be specified within a second input buffer or memory, identified by AN2. In the case where the VC number AN2 is transmitted on any one or more of the six control lines, the signal is transmitted in a different cycle to the other control signals.

Preferably, the control bus includes a further line for carrying a parity bit for protecting each of the above control bits or words (i.e. DR to VC number AN2).

The control bus further includes a clock signal line 380 for carrying reference clock signals of, for example, 156.25 MHz, in parallel with the data and odd parity bit to provide receive clocking for the data on the receiving IC.

The control bus includes a further line 382 on which a start of frame (SOF) pulse is transmitted in order to synchronize the data and control FIFO registers, as described below.

Interface Protocol and Cell Format

This section describes the timing relationship between the transfer of data cells and the transfer control signals across the interface, according to embodiments of the present invention. As will be described below, preferred embodiments of the invention format the control signals required to manage data transfer across the interface so that the control signals required for transferring each data cell are transmitted within a time period no greater than is required to transmit each data cell.

Figure 11A:
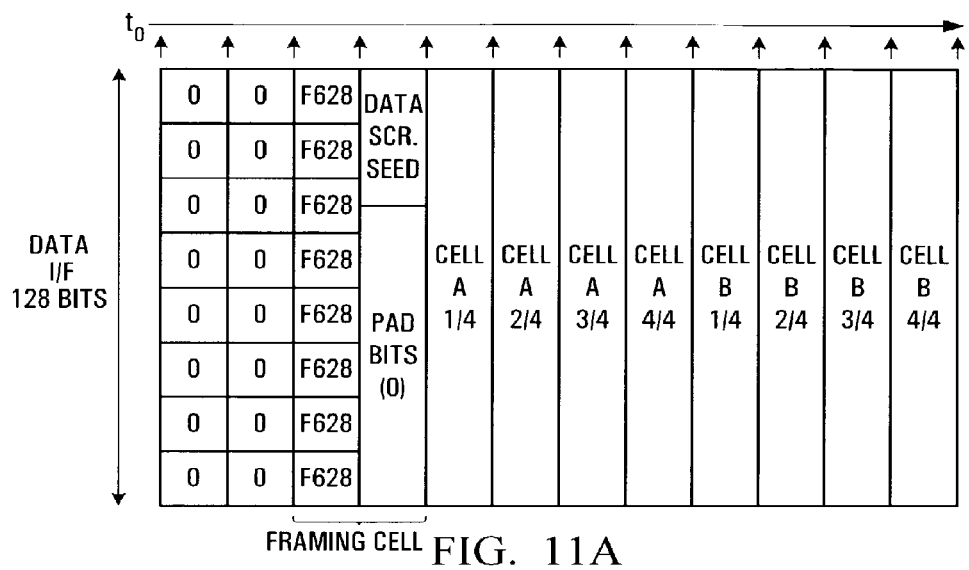
FIGS. 11A to 11F show an example of a timing diagram of an interface protocol and frame format according to an embodiment of the present invention.
Figure 11B:
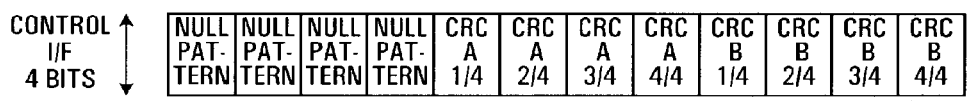
Figure 11C:
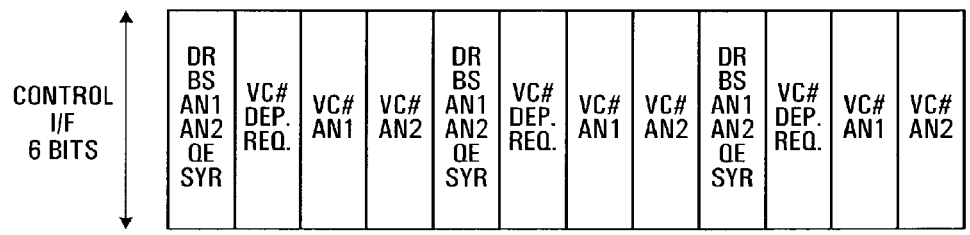
Figure 11D:
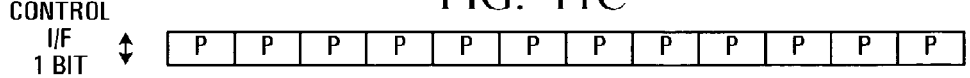
Figure 11E:
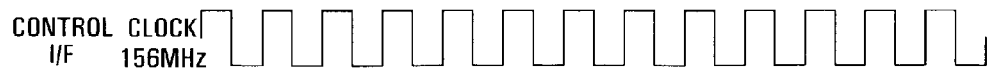
Figure 11F:

An example of an implementation of a protocol and frame format of an interface according to an embodiment of the present invention is shown in FIGS. 11A to 11F. FIGS. 11A to 11F show a plurality of successive time slots or time frames and the signals that are placed within each time frame on the data bus and control bus. In particular, FIG. 11A shows a sequence of time frames for the data bus, FIG. 11B shows a sequence of time frames for the CRC bits, FIG. 11C shows a sequence of time slots for the six data transfer control bits and other messages transmitted on the control bus, FIG. 11D shows a sequence of time slots for the parity bit, FIG. 11E shows a sequence of reference clock cycles and FIG. 11F shows a start of frame (SOF) signal relative to the time frames. It is to be noted that in this embodiment, each time frame corresponds to one clock cycle having a period of 1/frequency, where the frequency in the present embodiment is 156.25 MHz (although the clock frequency in other embodiments may have any other value.

Referring to FIG. 11A, the interface is arranged to transfer 128 bits of data over the data bus in each time slot, thereby permitting a data cell containing 512 bits to be transferred across the data bus in four clock cycles. As shown in FIG. 6, each of the 128-bit segments of the data cell are transmitted in parallel over 8 data bus channels in subsegments of 16 bits each.

For the purpose of synchronizing the transmit and receive interfaces, a framing cell is sent over each channel of the data bus. In the present embodiment, the framing cell is hexadecimal number f628 consisting of 16 bits and is chosen for its high edge density (0 to 1 transitions). However, in other embodiments, the framing cell may comprise any other suitable word. The framing cell may be transmitted over each channel in a single time slot to provide synchronization between all eight data bus channels at the receive side of the interface, as described below.

The next time slot following the framing cell cycle is used to transmit a data scrambling seed in order to synchronize the data de-scrambler with the data scrambler. The data scrambler seed uniquely identifies the initial part of the scrambling sequence used by the data scrambler to scramble the data cell, to enable the data de-scrambler to identify the portion of its de-scrambling sequence at which to start de-scrambling the data cell. The data scrambling seed may contain any number of bits required to achieve its purpose, and in one embodiment, the data scrambler seed contains 43 bits. In this case, as the data scrambler seed is transmitted as a 128-bit word, the remaining bits of the word are padded with zeros. Immediately following the two successive cycles associated with synchronization of the interface, data cells are transmitted across the interface each in four successive cycles, so that for example 128 bits of a 512 data cell is transferred in each time frame.

FIG. 11B shows an example of a transfer sequence of code on the four error check lines of the control bus and its timing relationship with the data transfer sequence of FIG. 11A. During each time frame both before and in which synchronization signals are passed over the data bus, a null pattern (for example, consisting of four zeros) is passed over the four error code lines of the control bus. For each time slot in which a 128-bit quarter-segment of a data cell is transmitted on the data bus, four bits of a 16-bit CRC code is transmitted over the four error code lines of the control bus. Therefore, the 16-bit CRC code associated with a 512-bit data cell is transferred over the interface in the same four cycles as the data cell.

FIG. 11C shows an example of a sequence of time slots allocated for various control signals that may be transmitted over the six control lines of the control bus and its relationship with the timing of signals on the data bus. Control signals required to manage data transfer over the interface are transmitted on the control bus in groups of four time slots, with each of the four time slots being reserved for a predetermined class of control bits.

In the example shown in FIG. 11C, the first time slot is reserved for the group of six control bits described above, namely a Departure Request bit (DR) a Buffer Select bit (BS), two Arrival Notification bits (AN1 and AN2), a Queue Empty bit (QE), and a Synchronization Request bit (SYR). The second of the four time frames is reserved for the VC Number Departure Request word (which may consist of six bits), the third of the four time frames is reserved for the VC number associated with the AN1 Arrival Notification (which may consist of up to six bits), and the fourth time frame is reserved for the VC number of the AN2 Arrival Notification (which may also consist of up to six bits. In the present embodiment, the time frame reserved for the six control signals is synchronized to and coincides with the first time slot reserved for transmitting the first 128-bit segment of a data cell, and each of the subsequent three time frames for the other control signals coincide with each of the further three time slots in which the second, third and fourth quarter segments of a data cell is transmitted over the data bus. The sequence of four time slots for the control signals is repeated for each data cell. This sequence of control time slots may also be used to carry control signals over the four cycle period immediately preceding transmission of the first data cell segment following the synchronization signals, as shown in the first four cycles of FIGS. 11A and C. The control signals associated with the transfer of a data cell from a specified queue are generally transmitted during a predetermined number of groups of four clock cycles preceding the four clock cycles in which the data cell from the specified queue is actually transferred across the interface.

It is to be noted that each of the control signals DR and SYR can be applied independently of each other to the control bus and therefore any one or more of these control signals can be transmitted on the control bus lines in any given time slot allocated for this group of signals. If in the allocated time slot, the DR bit is set, this indicates to the receive side of the control interface that a time slot within the next 3 time slots, and in this embodiment, the first of the next 3 time slots contains valid information identifying the queue in which the requested data is stored. If, in any allocated time slot the AN1 bit is set, this indicates that a predetermined time slot within the next 3 time slots and, in this embodiment, the second of the next 3 time slots contains information identifying the queue of a first input buffer or part of memory in which data is stored. Similarly, if in any allocated time slot the AN2 bit is set, this indicates that a predetermined time slot within the next 3 time slots, and in this embodiment, the third of the next 3 consecutive time slots contains information identifying the queue of a second buffer or part of memory in which data is stored. In other embodiments, the queue identifying information may be placed in the consecutive time slots in any other order.

The control signal transmission scheme is arranged such that all of the control signals required to pass a data cell from the first IC to the second IC (or vice versa) are transmitted between the first and second IC in no more time than is required to transmit a data cell. To achieve this, a minimum of an arrival notification and a departure request must be transmitted between the first and second IC within the same time period required to transmit a data cell. Since the arrival notification and departure request associated with transmitting a data cell from one IC to the other are transmitted on different control buses, and from opposite sides of the control interface, and each requires two time slots in this embodiment, both signals can be transmitted in just two clock cycles (time slots). However, in the present embodiment, four time slots are available for transmission of control signals per data cell, and therefore the capacity of each of the first and second control bus exceeds that required for one way data transfer. In the present embodiment, the additional capacity is used to transmit departure request information on the first control bus and arrival notification information on the second control bus, to implement data transfer from the second IC to the first IC, and by both the first and second IC to pass arrival notification information relating to a second input buffer or part of memory.

FIG. 11D shows an example of the timing of parity bits on the parity bit line. In this example, a parity bit is transmitted on the control bus in each time slot. The parity bit is used by the second IC to check the six control signals (DR to SYR) transmitted on the control bus, and in one embodiment, odd parity is used so that, if the number of '1s' on the 6 control signal bus lines in any time slot is an even number, the parity bit is '1', and if the number of '1s' is odd, the parity bit is '0'. The four bits of CRC code are not covered by the parity bit since the CRC code is checked independently and possibly corrected by the CRC checker before scheduling. Examples of methods for handling control bus errors are described below.

Synchronization of the Transmit and Receive Interfaces

Before data cells can be transmitted over the interface, the data and line de-scramblers of the receive interface must be synchronized with the data and line scramblers of the transmit interface. The following method may be used to synchronize the transmit and receive interfaces.

A synchronization request (SYR) is sent from the receiving IC to the transmitting IC, for example, by setting the sync request bit on the control bus. On detecting the sync request, the transmitting IC transmits a synchronization cell to the receiving IC. The sync or framing cell is transmitted in two consecutive time slots, in which the first cycle contains a framing pattern, and the second cycle contains a data scrambler seed indicating the current state of the data scrambler's Linear Feedback Shift Register (LFSR), as for example shown in FIG. 11A.

On receiving the sync (framing) cell, the data de-scrambler of the receive interface re-seeds its LFSR with the seed value contained in the sync cell, and the data de-scrambler is thereby synchronized with the data scrambler. The scrambling and de-scrambling functions of the data and line scramblers and de-scramblers, respectively, are disabled during the synchronization process so that the synchronization cell (i.e. the framing pattern and scrambler seed) are not scrambled.

The following method may be used to synchronize the line de-scrambler with the line scrambler. When the line scrambler is disabled, the LFSR of the line scrambler is reset to a predetermined hexadecimal number, for example, 55 hex. When the line de-scrambler is disabled, the LFSR of the line de-scrambler is also set to the predetermined hexadecimal number (e.g. 55 hex) and the de-scrambler LFSR may be seeded with the predetermined hex number immediately after it receives the synchronization cell. Thus, the line de-scrambler will begin to apply the line de-scrambler sequence to the data cell immediately following the sync cell at the same position in the sequence as the line scrambler, and the line de-scrambler is then synchronized with the line scrambler.

Data Bus Synchronization

In addition to the synchronization of the data and line de-scramblers with the respective data and line scramblers, there are two further aspects of the data bus that require synchronization. Firstly, the receive IC requires a means of identifying the start of a data cell transmitted on each channel of the data bus. Secondly, data transmission over the databus may result in an error in the arrival time of data on each channel of plus or minus one clock cycle, so that the time difference in the arrival of data cell segments on any two channels may be a maximum of two clock cycles. It is therefore necessary to provide a means of aligning each of the eight 16-bit cell segments before they are transmitted to the output scheduler.

Start-of-Cell Detection

Referring to FIG. 6, the receive side of the data bus includes a framer 363 for each of the eight data bus channels for detecting the start of a data cell. When synchronization is required, the transmit IC is arranged to transmit a framing cell over each of the eight channels which, in the embodiment shown in FIG. 11A, comprises a pattern of 16 bits, sent in a single time slot, followed by a data scrambler seed. Each framer is adapted to detect the framing pattern transmitted on each channel. In one embodiment, the framer includes a register for receiving each bit of the framing pattern in parallel and logic circuitry for processing the bits contained in the register and detecting the framing pattern (e.g. hexadecimal number f628). The clock cycle immediately following the framing pattern contains the data scrambler seed, and the framer is adapted to transmit the data scrambler seed directly to the receive interface 369 (i.e. without passing through the FIFO buffer 365). The second clock cycle which follows the framing pattern coincides with the start of a data cell (as shown in FIG. 11A), and the framer 365 is adapted to write the 16 bits received in this clock cycle into the FIFO register 365. Thus, the framer in each channel controls write operations into each FIFO register, and, as shown in FIG. 6, the position in the FIFO register of each current write operation is indicated by a pointer 366, 368, 370, (only three referenced by number) controlled by each framer, 363. Referring to the first three pointers only, in the example shown in FIG. 6, the current pointer 368 of the second channel is advanced one position relative to that of the first channel 366, and the current pointer 370 of the third channel is advanced two positions relative to that of the first channel, indicating that the framer of the second and third channels detected the framing pattern one clock cycle and two clock cycles, respectively, ahead of the framer of the first channel.

Data cell segments are read out from each FIFO register 365 into the receive interface 369 (as described below), and the receive interface 369 is arranged to perform an error check (e.g. CRC Error Check) on a predetermined number of data cells for determining synchronization. If no error is detected within the predetermined number of data cells, an in-frame state is declared and data cells can be continuously transmitted. However, if an error is detected within the predetermined number of data cells, an out-of-frame (OOF) state is declared, the sync request (SYR) bit on the second control bus from the receive IC to the transmit IC is set, and the departure request (DR) bit on the second control bus is cleared. Each time an out-of-frame state is declared, the sync request bit is set and the departure request bit is cleared until the non-synchronized framer(s) reframes. In one embodiment, for each sync request transmitted from one IC to another, a synchronization cell may also be sent on the corresponding data bus for synchronizing the framers at the other end, in case the far end framers also became unsynchronized (OOF).

Cell Alignment at the Receive Interface

As described above synchronization between the transmit and receive side of the interface for a particular channel of the data bus is acquired when the framer of that channel successfully detects a framing cell. However, the high speed serial link of each channel bridging the two IC's may lead to a time difference of up to two clock cycles in the arrival time of cell segments on different channels. Thus, at the receive side, segments of a data cell received over the different channels may be skewed, and it may be necessary to re-align the segments before the data cell is forwarded on, for example, to a network or to a different layer.

Figure 12:
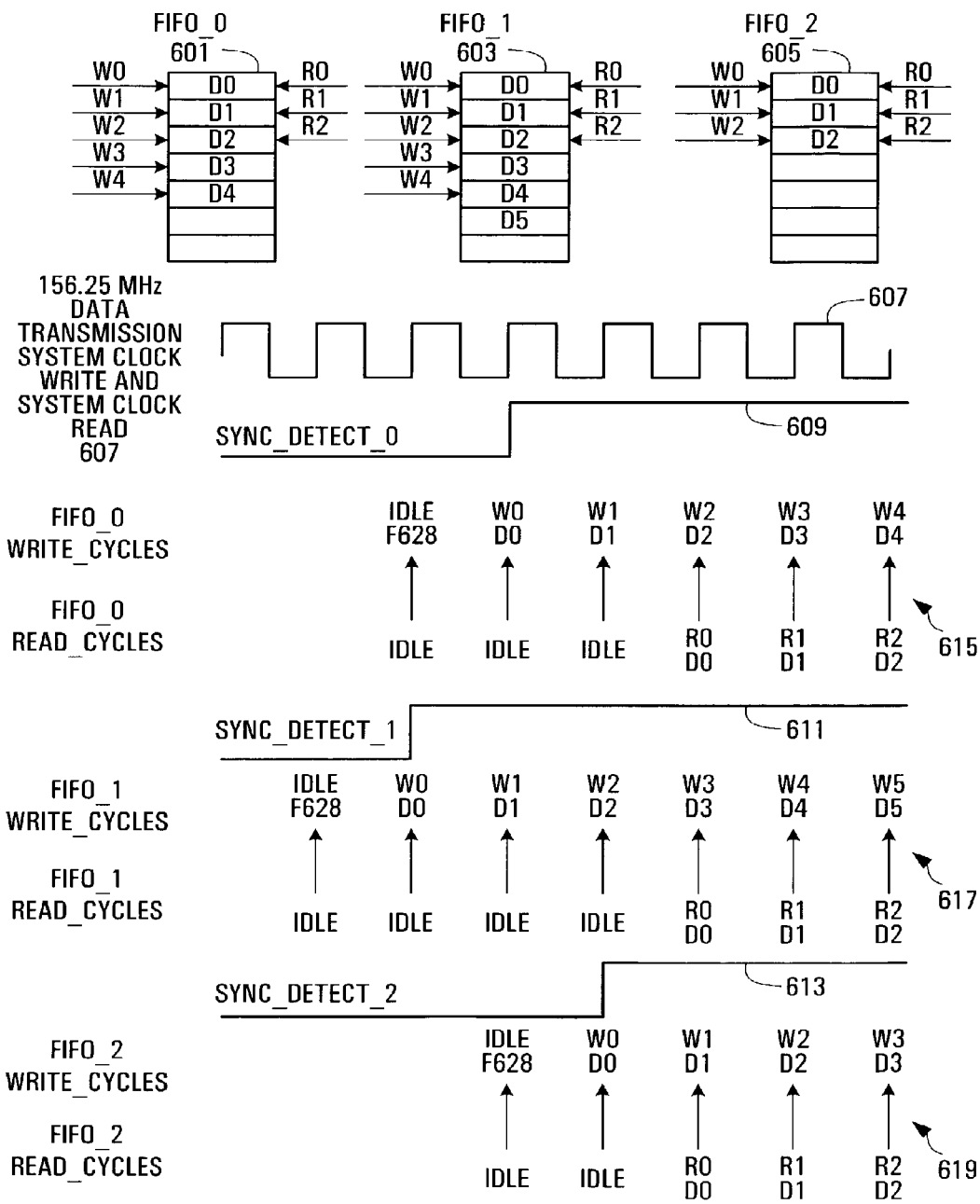
FIG. 12 shows a timing diagram illustrating a method of aligning cells transmitted over parallel channels of an interface, according to an embodiment of the present invention.

In one embodiment, the receive side of the data transmission system is arranged to re-align cell segments before the data cell is forwarded to the error checker, so that the error checker can operate on the entire width of a data cell, for example as shown in FIG. 9. In one embodiment, different cell segments of a data cell are aligned by controlling the start time of read operations of cell segments from the FIFO register of each channel of the data bus, for example shown in FIG. 6. An embodiment of a method of controlling read operations from the FIFO registers to re-align cell segments will now be described with reference to FIG. 12. FIG. 12 shows three FIFO registers 601, 603, 605 which may, for example, correspond to the FIFO registers of the first three channels (channel 0, 1 and 2) of the second IC 305 shown in FIG. 6. FIG. 12 also shows a timing diagram which includes a sequence of reference clock pulses 607, a synchronization detect pulse 609, 611, 613 for each FIFO register and a timing sequence 615, 617, 619 of read and write operations for each FIFO register.

In operation, when a framer associated with a particular channel detects a framing pattern of a framing cell, a synchronization state is recorded by, for example, setting a sync bit for that channel, as indicated by the sync detect pulses 609, 611, 613 shown in FIG. 12. Once the sync detect bit for a particular framer is set, the framer waits one clock pulse for the scrambler seed, and on the next clock pulse writes the first data cell segment into the first position of the FIFO register. Therefore, the start of data cell write operations to a particular FIFO depends on when the sync cell is detected for that particular channel. Consequently write operations may start at different times for different channels depending on when the sync cell was detected. However, read operations from all FIFOs are started only after all framers have detected the sync cell, and may be achieved by monitoring the status of the sync detect bits associated with each channel. In this way, the data cell segments read at the same time from each register correspond to the segments of the data cell initially transmitted together from the transmit side of the interface.

In the example shown in FIG. 12, the synchronization cell is detected by the framer of channel 1 one clock cycle ahead of channel 0 and two clock cycles ahead of channel 2. Write operations to a respective FIFO register remain idle until the sync detect bit is set, whereupon write operations commence, as indicated by the first write operation "WO" of the first data cell segment D0 immediately below the sync detect pulse. In this example, the first write operation into the FIFO of channel 1 commences one clock cycle ahead of the first write operation to the FIFO of channel 0 and two clock cycles ahead of the first write operation to the FIFO of channel 2. However, the first read operation, RO, from the FIFOs are timed together immediately following the first write operation of data into the last FIFO in respect of which a sync cell is detected, in this case the FIFO associated with channel 2.

Data Bus and Control Bus Alignment

A synchronization system is provided to control synchronization of the receive side of the control bus with the transmit side, and an embodiment of the control bus synchronization system will now be described with reference to FIGS. 6 and 11A to 11F.

As shown in FIGS. 6 and 11B to 11F, the control bus includes 13 lines, of which four are reserved for carrying CRC code, six are reserved for control signals and queue identification numbers and the remaining three for parity bits, a reference clock signal and a start of frame (SOF) pulse, respectively. Detection and synchronization of signals on the control bus is implemented by transmitting the SOF pulse simultaneously with the first frame of control signals and a predetermined number of time frames (in this case four) before transmission of the first four bits of CRC code. The receive side of the control bus interface includes a framer (not shown) that is adapted to detect the SOF signal. The framer may have an associated synchronization detect bit that is set on detecting the SOF pulse. Therefore detection of the SOF pulse indicates to the control bus receive interface, that in the same clock cycle in which the SOF pulse is detected, the first valid control signals are present on the control bus and the receive side of the control interface is now synchronized.

Error Code and Data Cell Alignment

In the present embodiment, data cells and their respective CRC code are transmitted to the CRC decoder over separate channels. An embodiment of an alignment system which ensures that a particular CRC code is applied to the correct data cell will now be described with reference to FIGS. 6 and 11. The technique involves aligning the CRC code with its respective data cell on the receive side of the interface before transmission of the data cell and its respective CRC code to the CRC decoder block (for example, as shown in FIG. 10). Alignment of the CRC code with the data cell proceeds as follows. Referring to FIG. 6, the framer on the receive side of the control bus is adapted to start writing bits received on the four CRC lines of the control bus into the control bus FIFO register 375 four clock cycles following detection of the SOF pulse, which corresponds to the clock cycle containing the first 4-bit segment of CRC code of the first data cell transmitted over the data bus, as shown in FIG. 11. Thereafter, the framer writes each successive 4-bit CRC code segment into the FIFO register in each successive clock cycle. The first read operation from the FIFO register is controlled to coincide with the first read operation from the FIFO registers associated with the data bus channels so that the first of the four 4-bit CRC code segments associated with the first data cell is transferred to the receive interface simultaneously with the first 128-bit data cell segment so that the CRC code is now aligned with its respective data cell.

Local Scheduler and Queue Manager Control

In a preferred embodiment, an IC is arranged to prevent the transmission of departure requests (e.g. from its output scheduler) and arrival notifications (e.g. from its queue manager(s)), as well as data cells, across the interface to its counterpart IC on receiving a sync request from the counterpart IC. Preferably, these operations are performed in response to receiving the first sync request bit. At the same time, the IC receiving the sync request may be adapted to repeatedly transmit a synchronization sequence across the data bus until no further sync request bits are received, indicating that each of the far-end framers are in-frame.

In one embodiment, the local scheduler and queue manager(s) are controlled only to use the interface if both sides of the interface are synchronized. Control of the scheduler and queue manager(s) may be implemented by a status bit or flag indicating the status of the interface for transmission, i.e. READY or NOT READY. The synchronization status of the transmit side may be indicated by a transmit status (TS) bit. For example, this bit may be set (i.e. high) when the framers at the far end of the interface are synchronized, as indicated by the absence of any valid sync request bits from the far end of the interface. In this case, the interface can be used for transmission from the IC at which no valid sync requests, are received to the far end IC. Alternatively, if a sync request is received from the far end, the TS bit is cleared to indicate that the far end framer is out-of-frame.

The synchronization status of the near end of the interface to receive data may be indicated by a receive status bit (RS). This bit is set (i.e. high) when the receive framer of a local IC is in-frame. The RS bit is cleared when the local receive framer is out-of-frame.

Both the TS and RS bits may be AND'ed together to give a single bit indicating whether or not both ends of the interface are synchronized, and may be referred to as an interface "READY" bit. This bit is forwarded to the scheduler and queue managers associated with the local IC and in one implementation, must be set (i.e. high) before the scheduler or queue manager(s) can use the interface link.

Interface Synchronization State Machine

Figure 13:
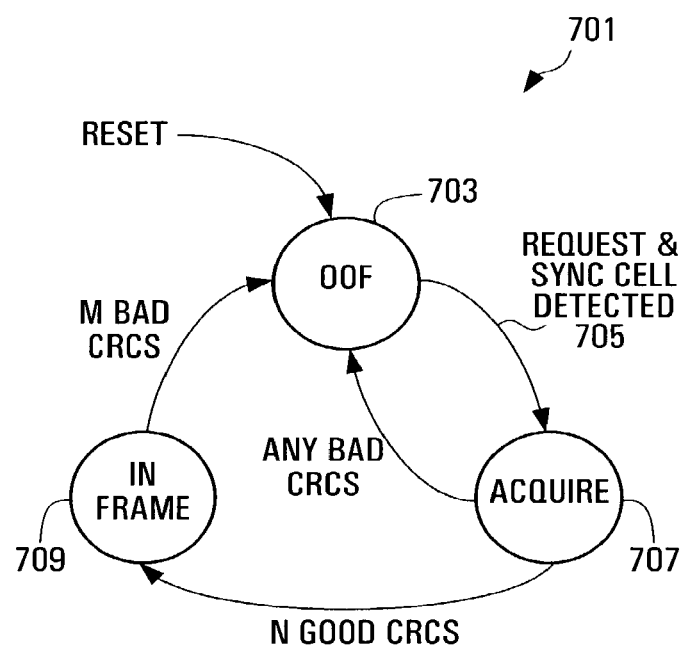
FIG. 13 shows a flow diagram of an interface synchronization state machine, according to an embodiment of the present invention.

An embodiment of a synchronization state machine which controls synchronization of a receive interface with a transmit interface is shown in FIG. 13.

When an IC is first installed and powered up, the state machine 701 is initially reset and passes to an out-of-frame (OOF) state 703, indicating that the receive interface is not synchronized with the transmit interface. On detecting an out-of-frame state, the transmit interface transmits a synchronization request on its control bus and a synchronization cell on the data bus to the receive interface, as indicated at 705. The receive interface detects both the sync request and sync cell and acquires synchronization at state 707. Data transmitted immediately following the sync cell is checked for errors (e.g. using CRC checking) and if any errors are detected, the state machine returns to an out-of-frame state 703.

Alternatively, if the error check performed on a predetermined number of data cells immediately following the sync cell shows no errors are present in the data, the state machine passes to an in-frame state 709. Subsequent data cells are checked for errors and if a predetermined number (M) of uncorrectable errors in the data occurs, the receive interface looses synchronization and the state machine again passes to an out-of-frame state 703, and the synchronization steps are repeated.

Maintaining Synchronization of the Interface

Embodiments of the present invention may be adapted to maintain synchronization between the data transfer bus and the error code transfer bus and also between the different data bus channels in the absence of any incoming data packets for transmission across the interface, by causing substitute data packets and associated error detection code to flow across the interface in place of real data packets and their associated code. Each substitute data packet is transmitted on the data transfer bus and preferably has a form that can be transmitted on the data bus in the same transmission format as a real data packet so that, for the purposes of transmission and synchronization, the substitute data packet is treated in the same way as a real data packet so that synchronization of the interface is maintained. For example, the substitute data packet may contain the same number of bits as a real data packet and maybe transmitted across the data transfer bus in the same number of time slots as a real data packet, and may be segmented for transmission over different parallel data channels as for a real data packet. For example, in the exemplary embodiment described above with reference to FIGS. 6 and 11A to 11F, the substitute data packet or cell may contain 512 bits and may be transmitted on the eight data bus channels in four consecutive time slots.

Associated error detection code may also be transmitted with each substitute data packet, in the same code transmission format as error detection code associated with real data packets to maintain synchronization of the code transfer bus. Thus, in the above example, a 16-bit error detection code may be transmitted on the code transfer bus in four segments of four bits each in four consecutive time slots.

On the receive side of the interface, each substitute data packet and its associated error detection code may be passed to the error detector, as for real data packets and associated code, for enabling errors which may have occurred in transmission of the substitute packet and/or the associated code to be detected, so that the transmission of substitute data packets preserves the ability of the interface to re-synchronize, if required. After each substitute data cell has been checked for errors by the receiving IC, the substitute data cell may be discarded rather than passed to the output scheduler for transmission from the IC. In this way, synchronization of the communication interface can be maintained in the absence of both incoming and outgoing data.

The transmission of substitute data packets and associated error code may be controlled by the data transmission controller (e.g. queue manager) of the transmitting IC, which may be arranged to detect the absence of real data packets for transmission to the receiving IC (for example by the absence of a departure request from the receiving IC) and may be arranged to initiate the transmission of a substitute data packet in the time slot immediately following the time slot used to transmit the last real data packet. The data transmission controller may continue to transmit substitute data packets for maintaining synchronization of the interface until the transmitting IC receives and is ready to transmit real data packets for transmission across the interface.

In embodiments of the present invention, the transmitting IC may further include an error detector for detecting errors in incoming data. For example, incoming data packets may include associated error detection code to enable the error detector to detect errors in the incoming data packet before the data packet is transmitted across the interface. In embodiments of the present invention, the same error detection code is transmitted with its associated data across the interface and is used by the receiving IC to detect errors in the associated data packet before being output from the receiving IC by the output scheduler. Data packet errors detected by the receiving IC may be interpreted by the receiving IC as a problem in the communication interface, and the receiving IC may be responsive to the detection of an error to interrupt data transmission and initiate re-synchronization. Advantageously, the provision of an error detector at the transmitting IC enables errors in incoming data packets to be detected before transmission across the interface so that errors present in incoming data can be distinguished from errors attributable to a problem with the interface.

In one embodiment, the transmitting IC may be arranged to transmit a substitute data packet on the data bus in place of an incoming corrupted data packet in which errors have been detected, in order to maintain synchronization of the data bus, and may also be arranged to transmit error detection code associated with the substitute data packet on the error code transfer bus in order to maintain synchronization across the error code data bus and with the data transfer bus. The substitute data packet and its associated error detection code may be transmitted according to the same transmission format as a real data packet (and, for example, may be segmented in the same way for transmission across multiple parallel data channels and in the same number of time slots. Advantageously, this arrangement effectively isolates the interface from transmitting corrupted data and/or error detection code across the interface which would otherwise cause an interruption in transmission and the need to re-synchronize. On the receive side of the interface, the substitute data packet and associated code may be transmitted to an error detector for detecting errors in the substitute data packet based on the error detection code, as for real data packets, and thereafter, the substitute data packet may be forwarded to the output scheduler to indicate to the scheduler that errors were present in an incoming data cell.

A substitute data cell, and associated error detection code may also be transmitted across the interface in the case where a departure request is received by the transmitting IC requesting a data packet from a specified queue but where the queue contains no data packets for transmission to the requesting IC, again to maintain synchronization across the interface.

Control Bus Error Handling

As described above in connection with FIGS. 6, 11c and 11d, signals on the control bus used to transmit signals other than error detection code may be protected by a parity bit, and the receiving IC may include a detector for detecting errors in control bus signals based on the parity bit. If an error is detected, none of the control bus signals transmitted in the time slot for which an error is detected can be trusted as correct. Embodiments of the present invention may be adapted to perform one or more of the following functions if a parity error is detected.

If the transmitting IC detects a parity error in a time slot allocated for a departure request (i.e. DR signal or DR VC number), the transmitting IC may be adapted to transmit a substitute data cell (or other signal) which indicates to the output scheduler that any departure request transmitted in that time slot has been ignored, thereby enabling the output scheduler to re-transmit the departure request, as necessary.

If a parity error is detected by the receiving IC in a time slot allocated for arrival notifications (e.g. AN or AN VC number signals), the arrival notifications may be ignored by the output scheduler. However, in embodiments in which the output scheduler ceases to request data packets from a particular queue in response to a queue empty signal, the cell for which the arrival notification is ignored will eventually be scheduled.

If a parity bit error is detected in a time slot allocated for a sync request signal, the receiving IC may be adapted to take no action to transmit a sync cell. If a sync request was transmitted in that time slot, the receiving IC may transmit another sync request from detecting errors in a subsequent data cell.

If a parity bit error is detected in a time slot allocated for a queue empty signal, the receiving IC may assume that no queue empty bit was transmitted. If a queue empty bit was in fact transmitted during that time slot, the transmitting IC may respond to a departure request in respect of that queue by transmitting a substitute data cell, indicating to the output scheduler that the queue is in fact empty, to enable the output scheduler to up date its record of the queue status.

In other embodiments of the present invention, the first and/or second integrated circuit may be replaced by a circuit formed on another form of substrate, for example, a board such as a printed circuit board, and the communication interface may be arranged to control the transfer of data between the first and second circuit.

Although embodiments of the present invention are particularly beneficial in enabling data to be transferred between circuits formed on discrete substrates, in other embodiments, the circuits may be formed on the same substrate, e.g. semiconductor chip or board.

The memory for receiving and temporarily storing data for transmission to the destination IC may comprise any suitable receiving means or storage means, including any suitable form of buffer or register(s), and the data may be stored statically, or dynamically, for example, so that data cells are moved or circulated while in storage.

Modifications and changes to the embodiments described above will be apparent to those skilled in the art.

Related Application: The applicant's copending Canadian Application No. 2,366,397, filed on 31 Dec. 2001, and from which the present application claims priority is incorporated herein by reference in its entirety.

The invention claimed is:

1. An integrated circuit chip, comprising:
a data input for receiving data from an external source;
a data output for outputting data received at the data input from the chip;
data transfer means for transferring data from the data input to the data output;
a control signal output for outputting control signals from the chip; and
a control signal generator for generating and transmitting control signals to said control signal output for controlling the transfer of data from an external source to said data output via said data input;
further comprising:
a second data input for receiving data from an external source;
a memory for storing said data;
a second data output for outputting data from the chip; and
a control signal input for receiving control signals from an external source for controlling the transfer of data from said memory to said second data output;
further comprising a code output for outputting code from the chip and code transmission means adapted to transmit from said code output error detection code associated with a data packet for enabling an error in said data packet to be detected; and
further comprising a code memory for storing code associated with each data packet and a memory controller responsive to a signal at said control signal input to output a requested data packet from said memory and the associated code from said code memory.

2. An integrated circuit chip as claimed in claim 1, comprising a memory controller arranged to output a data packet from said memory in a plurality of data packet segments, a respective segment being output in one of a plurality of successive time frames, and wherein said code transmission means is adapted to transmit code associated with each data packet in code segments, each code segment being transmitted to said code output in one of a plurality of successive time frames.

3. An integrated circuit chip, comprising:
a data input for receiving data from an external source;
a data output for outputting data received at the data input from the chip;
data transfer means for transferring data from the data input to the data output;
a control signal output for outputting control signals from the chip; and
a control signal generator for generating and transmitting control signals to said control signal output for controlling the transfer of data from an external source to said data output via said data input;
further comprising:
a second data input for receiving data from an external source;
a memory for storing said data;
a second data output for outputting data from the chip; and
a control signal input for receiving control signals from an external source for controlling the transfer of data from said memory to said second data output; and
further comprising synchronization signal transmission means for transmitting a synchronization signal from said chip for enabling an external device for receiving data and error correction code from said chip to align said data packets and their respective error correction code, in response to a signal at said control signal input indicative of the occurrence of an error in data packets transmitted from said second data output.

4. An integrated circuit chip as claimed in claim 3, wherein said control signal generator includes a scheduler for controlling the order in which data is transferred from said external source to said data input.

5. An integrated circuit chip as claimed in claim 3, further comprising a control signal input for receiving control signals.

6. An integrated circuit chip as claimed in claim 4, further comprising a control signal input, and wherein said scheduler is adapted to record a parameter indicative of the status of a data storage queue of an external source in response to a signal at said control signal input indicating the arrival of data for storage in the queue of said external source.

7. An integrated circuit chip as claimed in claim 3, wherein said control signal generator is adapted to transmit a control signal requesting data from an external source for enabling said external source to transmit the requested data to said data input.

8. An integrated circuit chip as claimed in claim 7, wherein the control signal includes an indication of the part of a memory at said external source from which said data is requested.

9. An integrated circuit chip as claimed in claim 8, further comprising a control signal input, and wherein said control signal generator is adapted to cease transmission of signals requesting data from a part of the memory of said external source in response to a control signal at said control signal input indicating that the part of said external memory is empty.

10. An integrated circuit chip as claimed in claim 3, further comprising a code input for receiving code associated with data packets received at said data input for enabling errors in said data packets to be detected, and error detection means for detecting errors in said data packets based on the error detection code associated with each data packet received at code input.

11. An integrated as claimed in claim 10, further comprising error notification means for transmitting a signal indicative of an error from said control signal output in response to said error detection means detecting an error in a data packet received at said data input.

12. An integrated circuit chip as claimed in claim 11, further comprising departure request transmission means for transmitting a departure request from said control signal output requesting data from an external source, said departure request transmission means being responsive to the detection of errors in data packets received at said data input to cease transmission of departure requests.

13. An integrated circuit chip as claimed in claim 10, further comprising synchronization means for aligning data packets received at said data input with their respective error detection code received at said code input and for passing data packets with their corresponding error detection code to said error detection means, said synchronization means being responsive to a synchronization signal transmitted from an external source to align said data packets and their respective error detection code.

14. An integrated circuit chip as claimed in claim 3, wherein said control signal generator is adapted for transmitting from said control signal output, a control signal having a first control function in one time slot and a control signal having a different function in a subsequent time slot.

15. An integrated circuit chip as claimed in claim 14, wherein said control signal generator is adapted for transmitting from said control signal output one or more control signals of a first group of possible control signals in a first time slot and for transmitting from said output a control signal having a different function to the first group of possible control signals in a second time slot.

16. An integrated circuit chip as claimed in claim 3, wherein said control signal generator is adapted for transmitting control signals in time slots of a repeating sequence of a plurality of successive time slots, and is capable of transmitting one or more control signals of a first group of possible control signals in one predetermined time slot of each sequence, and to transmit a control signal having a different function from the first group of control signals in another predetermined time slot of each sequence.

17. An integrated circuit chip as claimed in claim 3, wherein said control signal output comprises a plurality of output ports, and said control signal generator is capable of outputting on an output port in one time slot, a bit of a control signal having a predetermined function, and on said output port in another time slot, a bit of a control signal having a different function.

18. An integrated circuit chip as claimed in claim 17, wherein said control signal generator is adapted to output a control signal in one time slot from said output and a second control signal having a different function in another time slot from said output, wherein said first control signal has a different number of bits than said second control signal.

19. An integrated circuit chip as claimed in claim 3, wherein said control signal output comprises a plurality of output ports, and said control signal generator is adapted to transmit at least one respective control signal of a group of possible control signals on a respective output port, each of said possible control signals having a different function to the other control signals in the group, and to transmit in another time slot, a control signal on at least one of said plurality of output ports having a different function to that of each control signal of said group.

20. An integrated circuit chip as claimed in claim 3, wherein said data input comprises a plurality of data input ports and a transmission system for transmitting data from said input ports to said data output, said data transmission system including a plurality of data channels, each channel including a buffer for temporarily storing data received at an input port, buffer control means responsive to a predetermined signal received at said input port for initiating storage in said buffer of data received at said input port following said predetermined signal, said control means being responsive to an indication that the storage of data has been initiated in the buffers of all of said channels for outputting the first data following said predetermined signal from all of said buffers simultaneously.

21. An integrated circuit chip as claimed in claim 3, further comprising arrival notification means for outputting from said control signal output, a respective signal indicating the arrival of each data at said second data input.

22. An integrated circuit chip as claimed in claim 21, further comprising label detection means for detecting a label associated with incoming data, and wherein said arrival notification signal is indicative of said label.

23. An integrated circuit chip as claimed in claim 3, wherein said memory includes a plurality of queues, each for storing data to be transferred from said chip, and label detection means for detecting labels associated with incoming data, and data storage control means for storing data in said queues according to the label associated therewith.

24. An integrated circuit chip as claimed in claim 23, further including arrival notification means for outputting from said control signal output a respective signal indicating the arrival of each data at said second data input and identifying the queue in which said data is stored.

25. An integrated circuit chip as claimed in claim 3, wherein said memory includes a plurality of queues, each for storing data to be transferred from said chip, and said chip further includes queue status notification means for transmitting a signal from said control signal output indicating a status associated with each queue.

26. An integrated circuit chip as claimed in claim 25, wherein said queue status notification means is adapted to transmit a queue status indication when a queue in said memory is empty.

27. An integrated circuit chip as claimed in claim 3, wherein said second data output comprises a plurality of data output ports, and said chip further includes a data transmission system for transmitting data to said plurality of output ports and comprising a plurality of data channels, each channel comprising a converter and a plurality of bit lines for carrying data in parallel to said converter, and wherein said converter is adapted to convert a parallel data stream received on said bit lines into a serial bit stream for transmission from said output port.

28. An integrated circuit chip as claimed in claim 27, wherein said converter is adapted to accelerate the data transmission rate of said serial bit stream relative to the rate at which data is transmitted on one of said bit lines.

29. An integrated circuit chip as claimed in claim 28, wherein the data transmission rate of the serial bit stream from said converter is equal to the data rate of said parallel data stream.

30. An integrated circuit chip, comprising:
a data input for receiving data from an external source;
a data output for outputting data received at the data input from the chip;
data transfer means for transferring data from the data input to the data output;
a control signal output for outputting control signals from the chip; and
a control signal generator for generating and transmitting control signals to said control signal output for controlling the transfer of data from an external source to said data output via said data input;
further comprising:
a second data input for receiving data from an external source;
a memory for storing said data;
a second data output for outputting data from the chip; and
a control signal input for receiving control signals from an external source for controlling the transfer of data from said memory to said second data output;
wherein said control signal generator is adapted for transmitting control signals in time slots of a repeating sequence of a plurality of successive time slots, and is capable of transmitting one or more control signals of a first group of possible control signals in one predetermined time slot of each sequence, and to transmit a control signal having a different function from the first group of control signals in another predetermined time slot of each sequence; and wherein the period of each sequence of time slots is less than or equal to the period for transferring a data packet from said memory.

31. An integrated circuit chip as claimed in claim 30, wherein said group of possible control signals includes at least one of:
a signal indicating that a subsequent signal in a predetermined one of that sequence of time slots contains information identifying data,
a signal enabling a location of data to be identified,
a signal indicating the status of a queue in said memory, and
a signal resulting from the detection of an error in data received at said first data input.

32. An integrated circuit chip as claimed in claim 31, wherein said signal indicating the content of a subsequent signal at said control signal output includes at least one of a signal indicating that a subsequent signal in a predetermined time slot within said sequence of time slots identifies the location of said memory in which a data packet received at said second data input is stored, and a signal indicating that a subsequent signal in a predetermined time slot within said sequence of time slots contains information identifying the location of data at an external source for transfer to said first data input.

33. An integrated circuit chip as claimed in claim 32, wherein said control signal output includes a plurality of output ports, and said control signal generator is adapted for outputting each possible control signal of said first group from a different output port.

34. An integrated circuit chip as claimed in claim 32, wherein said control signal generator is capable of transmitting in the same time slot both said signal indicating that a subsequent signal within a predetermined time slot of said sequence of time slots identifies said location of said memory and said signal indicating that a subsequent signal in a predetermined time slot with said predetermined sequence of time slots identifies said location of said external source, and transmitting said signal containing information identifying the location in said memory in a different time slot of a sequence to the time slot used to transmit said signal containing information identifying a location of data at said external source.

35. An integrated circuit chip, comprising:
a data input for receiving data from an external source;
a data output for outputting data received at the data input from the chip;
data transfer means for transferring data from the data input to the data output;
a control signal output for outputting control signals from the chip; and
a control signal generator for generating and transmitting control signals to said control signal output for controlling the transfer of data from an external source to said data output via said data input;
further comprising:
a second data input for receiving data from an external source;
a memory for storing said data;
a second data output for outputting data from the chip; and
a control signal input for receiving control signals from an external source for controlling the transfer of data from said memory to said second data output;
wherein said second data output comprises a plurality of data output ports, and said chip further includes a data transmission system for transmitting data to said plurality of output ports, and comprising a plurality of data channels, each channel comprising a first converter, a first plurality of bit lines for carrying data in parallel to said first converter, a second converter, a second plurality of bit lines for carrying data from said first converter to said second converter, wherein said first converter is adapted to convert a first parallel data stream carried on said first plurality of bit lines into a second parallel bit stream for transmission on said second plurality of bit lines to said second converter, wherein said second parallel bit stream is capable of being carried on fewer bit lines than said first parallel data stream and said second converter is adapted to convert said second parallel data stream into a serial bit stream for transmission from said output port.

36. An integrated circuit chip as claimed in claim 35, wherein said first converter is adapted to accelerate the data transmission rate of data output on one of said second plurality of bit lines relative to the rate at which data is transmitted on one of said first plurality of bit lines.

37. An integrated circuit chip as claimed in claim 36, wherein said second converter is adapted to accelerate the transmission rate of said serial bit stream relative to the rate at which data is transmitted on one of said second plurality of bit lines.

38. An integrated circuit chip, comprising:
a data input for receiving data from an external source;
a data output for outputting data received at the data input from the chip;
data transfer means for transferring data from the data input to the data output;
a control signal output for outputting control signals from the chip; and
a control signal generator for generating and transmitting control signals to said control signal output for controlling the transfer of data from an external source to said data output via said data input;
further comprising:
a second data input for receiving data from an external source;
a memory for storing said data;
a second data output for outputting data from the chip; and
a control signal input for receiving control signals from an external source for controlling the transfer of data from said memory to said second data output;
further comprising a data transmission controller responsive to a signal at said control signal input for outputting a data packet from said memory in a plurality of data packet segments, wherein a respective segment is output in a respective one of a plurality of successive time slots; and
further comprising a code output for outputting code associated with a data packet for enabling errors in said data packet to be detected, and a code transmission controller responsive to a signal at said control signal input for outputting said error detection code from said code output in a plurality of code segments, wherein a respective code segment is output in a respective one of a plurality of successive time slots.

39. An integrated circuit chip as claimed in claim 38, further comprising a code output for outputting code associated with a data packet for enabling errors in said data packet to be detected, and a code transmission controller responsive to a signal at said control signal input for outputting said error detection code from said code output in a plurality of code segments, wherein a respective code segment is output in a respective one of a plurality of successive time slots, and said code transmission controller is adapted to transmit said code segments in the same or fewer number of time slots required for outputting said data packet.

40. An integrated circuit chip as claimed in claim 38, wherein said control signal generator is adapted to transmit a control signal from said control signal output identifying the part of said memory in which an incoming data packet received at said second data input is stored and/or a control signal identifying a location of data in an external source for transmission to said first data input port within a period of less than or equal to the period required for outputting all segments of a data packet from said memory.

* * * * *